(12) United States Patent
Nicholson et al.

(10) Patent No.: US 8,974,910 B2
(45) Date of Patent: Mar. 10, 2015

(54) TREATMENT OF WOOD FOR THE PRODUCTION OF BUILDING STRUCTURES AND OTHER WOOD PRODUCTS

(75) Inventors: John William Nicholson, Bend, OR (US); Justice John William Hoffman, Bend, OR (US)

(73) Assignee: JELD-WEN, inc., Portland, OR (US)

( * ) Notice: Subject to any disclaimer, the term of this patent is extended or adjusted under 35 U.S.C. 154(b) by 22 days.

(21) Appl. No.: 12/661,417

(22) Filed: Mar. 15, 2010

(65) Prior Publication Data

US 2010/0266841 A1    Oct. 21, 2010

Related U.S. Application Data

(63) Continuation of application No. 11/240,905, filed on Sep. 30, 2005, now abandoned.

(60) Provisional application No. 60/614,807, filed on Sep. 30, 2004.

(51) Int. Cl.
| | |
|---|---|
| *B32B 21/08* | (2006.01) |
| *B27K 5/00* | (2006.01) |
| *B27K 3/04* | (2006.01) |
| *B27K 3/15* | (2006.01) |
| *C08G 18/62* | (2006.01) |
| *C09J 131/04* | (2006.01) |
| *C09J 175/04* | (2006.01) |
| *B27K 3/02* | (2006.01) |
| *B27K 3/08* | (2006.01) |

(52) U.S. Cl.
CPC . *B27K 5/001* (2013.01); *B27K 3/04* (2013.01); *B27K 3/15* (2013.01); *C08G 18/6204* (2013.01); *C09J 131/04* (2013.01); *C09J 175/04* (2013.01); *B27K 3/0285* (2013.01); *B27K 3/08* (2013.01)

USPC ............ 428/537.1; 428/355 R; 428/355 AC; 427/393

(58) Field of Classification Search
None
See application file for complete search history.

(56) References Cited

U.S. PATENT DOCUMENTS

| 619,676 A | 2/1899 | Cronin |
|---|---|---|
| 670,939 A | 4/1901 | Rapp |

(Continued)

FOREIGN PATENT DOCUMENTS

| CA | 57271 | 10/1986 |
|---|---|---|
| CA | 2437826 | 8/2002 |

(Continued)

OTHER PUBLICATIONS

Zhang et al., Study on Characteristic of Aqueous Polymer Isocyanate Curing Reaction, 2010, Applied Mechanics and Materials, vols. 26-28, pp. 1061-1064.*

(Continued)

*Primary Examiner* — Callie Shosho
*Assistant Examiner* — Patrick English
(74) *Attorney, Agent, or Firm* — Stoel Rives LLP

(57) ABSTRACT

Compositions and devices for the production of treated wood products are disclosed. A moisture exchange container for treating a plurality of wood pieces with a chemical formulation of interest is described. Also, an adhesive suitable for gluing wood pieces that have been treated, or that are going to be treated, with a chemical formulation of interest is described. Also disclosed are methods and systems using the devices and compositions of the present invention, and treated wood products.

13 Claims, 13 Drawing Sheets

(56) References Cited

U.S. PATENT DOCUMENTS

| | | |
|---|---|---|
| 877,922 A | 2/1908 | Gager |
| 1,183,842 A | 5/1916 | Alling |
| 1,525,255 A | 2/1925 | Starks |
| 1,544,496 A | 6/1925 | Starks |
| D132,040 S | 4/1942 | Cummings |
| 2,343,740 A | 3/1944 | Birmingham |
| 2,578,039 A | 2/1951 | Bonnell et al. |
| 2,682,083 A | 6/1954 | Patton |
| 2,797,450 A | 7/1957 | Ropella |
| 2,831,793 A | 4/1958 | Elmendorf |
| 3,098,781 A | 7/1963 | Greten |
| 3,121,263 A | 2/1964 | Binner |
| 3,212,948 A | 10/1965 | McMahon |
| 3,308,013 A | 3/1967 | Bryant |
| 3,440,189 A | 4/1969 | Sharp et al. |
| 3,484,994 A | 12/1969 | Ashby et al. |
| 3,512,304 A | 5/1970 | Meuret |
| 3,533,190 A | 10/1970 | Hilfinger et al. |
| 3,546,841 A | 12/1970 | Smith et al. |
| D222,775 S | 12/1971 | Sartori |
| 3,639,200 A | 2/1972 | Elmendorf et al. |
| 3,773,587 A | 11/1973 | Flewwelling |
| 3,793,125 A | 2/1974 | Kunz |
| 3,796,586 A | 3/1974 | Hanlon et al. |
| 3,824,058 A | 7/1974 | Axer et al. |
| 3,899,860 A | 8/1975 | Newell |
| 3,919,017 A | 11/1975 | Shoemaker et al. |
| 3,987,599 A | 10/1976 | Hines |
| D244,736 S | 6/1977 | Palka |
| D245,824 S | 9/1977 | Palka |
| 4,072,558 A | 2/1978 | Akerson |
| 4,100,138 A | 7/1978 | Bilow et al. |
| 4,100,328 A | 7/1978 | Gallagher |
| 4,104,828 A | 8/1978 | Naslund et al. |
| 4,125,486 A | 11/1978 | Uzumaki et al. |
| 4,142,007 A | 2/1979 | Lampe et al. |
| 4,146,662 A | 3/1979 | Eggers et al. |
| 4,183,187 A | 1/1980 | Simard |
| 4,236,365 A | 12/1980 | Wheeler |
| 4,246,310 A | 1/1981 | Hunt et al. |
| 4,248,163 A | 2/1981 | Caughey et al. |
| 4,268,565 A | 5/1981 | Luck et al. |
| 4,277,428 A | 7/1981 | Luck et al. |
| D266,042 S | 9/1982 | Moore et al. |
| D266,720 S | 11/1982 | Moore et al. |
| 4,359,507 A | 11/1982 | Gaul et al. |
| 4,361,612 A | 11/1982 | Shaner et al. |
| 4,364,984 A | 12/1982 | Wentworth |
| 4,388,138 A | 6/1983 | Brown et al. |
| 4,396,673 A | 8/1983 | Ball et al. |
| 4,433,095 A * | 2/1984 | Hombach et al. ............. 524/563 |
| 4,441,296 A | 4/1984 | Grabendike et al. |
| D274,107 S | 6/1984 | Gordon |
| D274,944 S | 7/1984 | Coppa |
| 4,503,115 A | 3/1985 | Hemels et al. |
| 4,542,046 A | 9/1985 | Moldrup et al. |
| 4,544,440 A | 10/1985 | Wheeler |
| 4,550,540 A | 11/1985 | Thorn |
| 4,552,797 A | 11/1985 | Munk et al. |
| D282,426 S | 2/1986 | Heimberger et al. |
| 4,579,613 A | 4/1986 | Belanger |
| 4,610,900 A | 9/1986 | Nishibori |
| 4,610,913 A | 9/1986 | Barnes |
| D286,177 S | 10/1986 | Case et al. |
| 4,622,190 A | 11/1986 | Schultz |
| 4,643,787 A | 2/1987 | Goodman |
| D292,766 S | 11/1987 | Palka |
| 4,706,431 A | 11/1987 | Corvese |
| 4,720,363 A | 1/1988 | Mayumi et al. |
| 4,725,382 A | 2/1988 | Lewchalermwong |
| 4,783,221 A * | 11/1988 | Grove ........................ 106/18.22 |
| 4,811,538 A | 3/1989 | Lehnert |
| 4,830,929 A | 5/1989 | Ikeda et al. |
| 4,853,062 A | 8/1989 | Gartland |
| 4,876,154 A | 10/1989 | Witucki et al. |
| 4,876,838 A | 10/1989 | Hagemeyer |
| D304,983 S | 12/1989 | Palka |
| 4,896,471 A | 1/1990 | Turner |
| 4,897,975 A | 2/1990 | Artwick et al. |
| 4,901,493 A | 2/1990 | Thorn |
| 4,908,990 A | 3/1990 | Yoon et al. |
| 4,942,084 A | 7/1990 | Prince |
| D311,957 S | 11/1990 | Hall |
| D314,242 S | 1/1991 | Mikolaitis |
| D314,625 S | 2/1991 | Hall |
| 5,016,414 A | 5/1991 | Wang |
| D319,884 S | 9/1991 | Hall |
| 5,074,087 A | 12/1991 | Green |
| 5,074,092 A | 12/1991 | Norlander |
| 5,075,059 A | 12/1991 | Green |
| 5,142,835 A | 9/1992 | Mrocca |
| 5,167,105 A | 12/1992 | Isban et al. |
| D335,982 S | 6/1993 | Brandon |
| 5,219,634 A | 6/1993 | Aufderhaar |
| D338,718 S | 8/1993 | Izzo |
| 5,239,799 A | 8/1993 | Bies et al. |
| 5,262,217 A | 11/1993 | Blaauw |
| 5,293,726 A | 3/1994 | Schick |
| 5,308,910 A | 5/1994 | Yuki et al. |
| D349,352 S | 8/1994 | Csati |
| 5,344,484 A | 9/1994 | Walsh |
| 5,355,654 A | 10/1994 | Stanley |
| 5,369,869 A | 12/1994 | Bies et al. |
| 5,397,406 A | 3/1995 | Vaders et al. |
| 5,401,556 A | 3/1995 | Ishitoya et al. |
| 5,443,891 A | 8/1995 | Bach |
| 5,470,631 A | 11/1995 | Lindquist et al. |
| D366,939 S | 2/1996 | Schafernak |
| D367,121 S | 2/1996 | Schafernak |
| 5,498,670 A | 3/1996 | Aoyama et al. |
| 5,498,690 A | 3/1996 | Kim et al. |
| D370,269 S | 5/1996 | Schafernak |
| D371,852 S | 7/1996 | Schafernak |
| 5,543,234 A | 8/1996 | Lynch et al. |
| D375,424 S | 11/1996 | Burwick |
| 5,634,508 A | 6/1997 | Herbst |
| 5,652,023 A | 7/1997 | Bergervoel et al. |
| D382,350 S | 8/1997 | Lynch |
| D388,196 S | 12/1997 | Schafernak et al. |
| 5,766,774 A | 6/1998 | Lynch et al. |
| 5,782,055 A | 7/1998 | Crittenden |
| 5,824,370 A | 10/1998 | Bergervoet et al. |
| 5,887,402 A | 3/1999 | Ruggie et al. |
| 5,900,463 A | 5/1999 | Tanimoto et al. |
| D411,022 S | 6/1999 | Schafernak et al. |
| 5,941,032 A | 8/1999 | Lydon, Jr. |
| 5,945,473 A | 8/1999 | Kielbania et al. |
| 5,950,382 A | 9/1999 | Martino |
| 5,972,266 A | 10/1999 | Fookes et al. |
| 6,024,908 A | 2/2000 | Koncelik |
| D426,645 S | 6/2000 | Bonomo et al. |
| 6,073,419 A | 6/2000 | Moves |
| 6,092,343 A | 7/2000 | West et al. |
| 6,185,894 B1 * | 2/2001 | Sisco et al. ...................... 52/457 |
| 6,200,687 B1 | 3/2001 | Smith et al. |
| 6,212,846 B1 | 4/2001 | Johnston |
| 6,231,651 B1 * | 5/2001 | Schultz et al. ............. 106/18.32 |
| 6,274,199 B1 | 8/2001 | Preston et al. |
| 6,277,943 B1 | 8/2001 | Sharpeshkar et al. |
| 6,306,939 B1 | 10/2001 | Gupta et al. |
| 6,309,503 B1 | 10/2001 | Martino |
| 6,312,540 B1 | 11/2001 | Moyes |
| 6,335,082 B1 | 1/2002 | Martino |
| 6,378,266 B1 | 4/2002 | Ellingson |
| 6,401,414 B1 | 6/2002 | Steel et al. |
| 6,485,800 B1 | 11/2002 | Littlschwager et al. |
| 6,487,824 B1 | 12/2002 | West et al. |
| 6,531,010 B2 | 3/2003 | Puppin |
| 6,569,540 B1 | 5/2003 | Preston et al. |
| 6,588,162 B2 | 7/2003 | Lynch et al. |
| 6,620,459 B2 | 9/2003 | Colvin et al. |
| 6,686,056 B2 | 2/2004 | Roos et al. |
| 6,777,102 B2 | 8/2004 | Sakurai et al. |
| 6,811,731 B2 | 11/2004 | Archer et al. |

(56) References Cited

U.S. PATENT DOCUMENTS

| | | | |
|---|---|---|---|
| 6,884,852 B1 | 4/2005 | Klauck et al. | |
| 7,137,232 B2 | 11/2006 | Lynch et al. | |
| 7,178,308 B2 | 2/2007 | Fagan et al. | |
| 7,284,352 B2 | 10/2007 | Lynch et al. | |
| 7,337,544 B2 | 3/2008 | Fagan et al. | |
| 7,370,454 B2 | 5/2008 | Lynch et al. | |
| 2001/0001356 A1 | 5/2001 | West et al. | |
| 2001/0026862 A1 | 10/2001 | Smith et al. | |
| 2001/0031819 A1* | 10/2001 | Iwata et al. | 524/443 |
| 2001/0052657 A1 | 12/2001 | Jacobsen | |
| 2002/0000683 A1 | 1/2002 | Sears et al. | |
| 2002/0005602 A1 | 1/2002 | Jacobsen | |
| 2002/0068161 A1 | 6/2002 | Matuana et al. | |
| 2002/0091218 A1 | 7/2002 | Ford et al. | |
| 2002/0106498 A1 | 8/2002 | Deaner et al. | |
| 2002/0121327 A1 | 9/2002 | Mente et al. | |
| 2002/0121340 A1 | 9/2002 | Mente et al. | |
| 2002/0155223 A1 | 10/2002 | Colvin et al. | |
| 2003/0015122 A1 | 1/2003 | Moriarty et al. | |
| 2003/0171457 A1 | 9/2003 | Malanda et al. | |
| 2003/0200714 A1 | 10/2003 | Minke et al. | |
| 2003/0204010 A1 | 10/2003 | Iwata et al. | |
| 2004/0034113 A1 | 2/2004 | Shidaker et al. | |
| 2004/0067353 A1 | 4/2004 | Miller et al. | |
| 2004/0219382 A1 | 11/2004 | Davina et al. | |
| 2007/0044911 A1 | 3/2007 | Horton | |

FOREIGN PATENT DOCUMENTS

| | | |
|---|---|---|
| DE | 3801486 | 8/1989 |
| EP | 0049299 | 4/1982 |
| EP | 0103048 | 3/1984 |
| EP | 0225629 | 6/1987 |
| EP | 0346640 | 12/1989 |
| EP | 0688639 | 3/1996 |
| EP | 0909295 | 3/2002 |
| GB | 1308549 | 2/1973 |
| GB | 1318076 | 5/1973 |
| GB | 2349163 | 10/2000 |
| GB | 2369350 | 5/2002 |
| RU | 2165843 | 4/2001 |
| WO | WO02/064337 | 8/2002 |
| WO | WO 03093385 A2 * | 11/2003 |
| WO | WO2004/076141 | 9/2004 |

OTHER PUBLICATIONS

Wildman, How to Use a Finger Joint Router Bit, retrieved Feb. 9, 2012, pp. 1-2, http://www.ehow.com/how_5730511_use-finger-joint-router-bit.html.*
Huntsman, Isocyanate Product Line 2010, retrieved Feb. 13, 2012, pp. 1-6.*
Wiley, 4,4'-Methylene diphenyl isocyanate (MDI) and polymeric MDI (PMDI) [MAK Value Documentation, 1997], 2012, The MAK Collection for Occupational Health and Safety, pp. 66-96.*
PCT International Search Report and Written Opinion dated Jul. 5, 2008.
RU 2165843 English translation.
Wood Decay: New Technology for an Age-Old Problem, AIA Architectural Record Continuing Education Series, Architectural Record, Oct. 2003.
Annex to the Invitation to Pay Additional Fees (Form PCT/ISA/206), dated Apr. 5, 2006.
"Factory-Fitted Douglas Fir Entrance Doors", U.S. Department of Commerce, Commercial Standard CS91-41, Feb. 10, 1941.
Douglas Fir Doors, E.A. Nord Company, Specifications of Pacific Northwest Fir Doors, 3 pgs, 1953.
Mercer, Henry C., Sc. D., "Ancient Carpenter's Tools." The Bucks County Historical Society, Doylestown, PA, p. 131-133, 1960.
Architectural Woodwork Quality Standards, Guide Specifications and Quality Certification Program, Fifth Edition, The Architectural Woodwork Institute. p. 109.
Lloyd, William B., Millwork Principles and Practices, Manufacture-Distribution-Use, Cahners Publishing Company, Inc., Chicago, IL., in assoc. with The National Woodwork manufactures Association, Inc., Table of Contents, pp. 192, 241, 116-117, 167, 173 © 1966.
Feirer, John L., Cabinet Making and Millwork, Chas A. Bennett Co., Inc., Peoria, IL., pp. 4, 8-14, 145-146, 596-597, and 684-687, © 1967.1970.
A recorded voluntary standard of the trade published by the U.S. Dept. of Commerce, Commercial Standard CS73-61, Old Growth Douglas Fir, Sitka Spruce and Western Hemlock Doors, 3 pgs., Mar. 20, 1961.
1981 Sweet's Catalogue, Section 8-3/50, p. 7.
Masonite Brand Door Facings—brochure, published in 1987.
Elite Doors—brochure, apparently published in Oct. 1987.
Quality Doors brochure © 1988.
"The New Mission Series" product brochure by Nord, Part of the JELD-WEN family, 300 W. Marine View Drive, Everett, WA 98201-1030, in existence at least as of Oct. 29, 2002.
1981 Sweet's Catalogue, Section 8.3/MO, p. 3, door in center of page.
VISADOR brochure, date unknown.
AURORA brochure, "Elements of Enduring Beauty", dated 2002.
JELD-WEN brochure, "Knotty Alder Composite Exterior Doors", dated 2003.
Wilsonart International, MSDS, Material Safety Data Sheet, 2005, pp. 1-6.
Premdor, Construction of Premdor Doors, Flush Hollow-Core Series, Premdor Reference Guide, 1998, pp. 27-28.
What's New in Entry Doors: Manufacturers and Suppliers Offer a Variety of New Ways to Enhance Aesthetics and Performance, Window and Door, Aug. 2000, pp. 75-76.
Raised Panel Interior Doors by Premdor, Jun. 2000.
Schut, J. H., "Wood is Good for Compounding, Sheet and Profile". Plastics Technology Online Article, web page at http://www.webclipping.com/cgi-bin/hl.cgi?a?2925&c=10473&t-3, as available via the Internet and printed Feb. 13, 2001.
Fiberglass Non-Textured Entry Systems, Masonite International Corporation, Big Builder, May 2003.
Grand Passage Fiberglass Entrances by Georgia Pacific, 1994.
You Won't See G-P Products in the New American Home, Georgia Pacific, 1994.
The Finest Material, Dixie Pacific Manufacturing Company, 1996.
Products, Open Designer's Door, Professional Builder, Jun. 1994, p. 127.
Blomberg Window Systems, 2000.
ABTCO, The Ultimate Source for Next-Generation Building Products, ABT Building Products Corporation, 1996.
Lifetime Doors, Inc., Welcome to Lifetime Doors, web page at wysiwyg://29/http://www.lifetimedoors.com/Lifetime2.htm as available via the Internet and printed Jan. 2, 2001.
Windows and Patio Doors, Lincoln Windows, brochure, 2000, 57 pgs.
Sliding Patio Doors, web page at http://www.lincolnwindows.com/sIdoor.htm as available via the Internet and printed Jan. 18, 2001.
Wood Interior-Vinyl Exterior, Lincoln W-V Series, Lincoln Windows, 2000.
Home Improvement Products by Pacesetter Corporation, web page at http://www.pacesettercorp.com/whatsnew as available via the Internet and printed Jan. 17, 2001.
Tucker Millworks, "Climate Seal" Product Line, web page at http://www.tuckermillworks.com/csealintro.htm as available via the Internet and printed Jan. 24, 2001.
Smooth-Star Raised-Panel Fiberglass Doors, Therma Tru Doors, 2000.
Outswing French Door, "Are You Prepared for the Possibilities?" web page at http://www.marvin.com/showroom/bodies/outswing.asp as available via the Internet and printed Jun. 19, 2000.
Mate Building Material, Milgard Windows, web page at www.milgard.com as available via the Internet, 2001.
Milgard WoodClad Windows and Doors, Milgard Windows, 1998.
"A Window is Just a Window . . . Unless it's a Milgard Window." Milgard Windows, Jun. 2003.

(56) References Cited

OTHER PUBLICATIONS

Fiberglass Entry Systems, Timberline: A New Generation of Beauty, Mar. 2002.
Jeld-Wen Windows and Doors, Auralast Wood, web page at http://www.keld-wen.com/auralast.cfm as available via the Internet and printed May 24, 2004.
ASTM, Standard Specification for Adhesives for Finger Joints in Nonstructural Lumber Products, 17 pgs, 1999.
Huntsman Polyurethanes, New Advances in Polymeric MDI Variants, EUROCOAT 2002, Barcelona, Spain, Jun. 2002.
How to Measure, Entry Doors, Door Comparison, web page at http://www.stanleyworks.com/productgroups/doors/comparisons.asp as available via the Internet and printed Apr. 11, 2002.
Intro 2, Entry Doors, Stanley's Commitment to Quality and Value, web page at http://www.stanleyworks.com/productgroups/doors/doors.asp as available via the Internet and printed Apr. 11, 2002.
Products and Services, Robert Bowden, Inc. Building Materials and Millwork, 2001.
What You've Come to Expect from Milgard Windows, Building Products, Nov.-Dec. 2001.
"You Have Precisely One Window in Mind. Which is Why We Offer Roughly 4,000,000 Variations." Milgard Windows, Residential Architecture, May 2002.
Barnett Millworks Inc. introduces Mahogany Entry Door Systems, 2000.
Semco Windows and Doors. We page available at www.semicowindows.com as available via the Internet and printed Aug. 2000.
Knock on Wood, Pro Sales, Mar. 2002.
Gluing, Laminating and Veneering, Wood Glue Reference Guide, web page at www.redbookonline.com as available via the Internet Mar. 2004.
The Glue Store, Adhesives 101, Types and Uses of Adhesive, web page at http://www.glue-store.com/adhesives101.html as available via the Internet and printed Sep. 30, 2005.
Ashland, Infotech, ISOSet CX-47 Crosslinking Agent, Sep. 2000.
National Research Council Canada, CCMC Evaluation Report, 3 pgs, 2003.
Office Action dated Dec. 16, 2009 for U.S. Appl. No. 11/240,905.
Office Action dated Mar. 4, 2009 for U.S. Appl. No. 11/240,905.
Office Action dated Apr. 8, 2008 for U.S. Appl. No. 11/240,905.
Office Action dated Nov. 29, 2007 for U.S. Appl. No. 11/240,905.
Office Action dated Jun. 1, 2007 for U.S. Appl. No. 11/240,905.
W. Ramsay Smith and Qinglin Wu, "Durability Improvement for Structural Wood Composites Through Chemical Treatments". Feb. 2005.
Naruhito Hori, Kentaro Asai, Akio Takemura; "Effect of the Ethylene/Vinyl Acetate Ratio of Ethylene-Vinyl Acetate Emulsion on the Curing Behavior of an Emulsion Polymer Isocyanate Adhesive for Wood." Published on-line: May 23, 2008, J Wood Sci (2008) 54:249-299 © The Japan Wood Research Society 2008.
Hechinger Brochure—dated Mar. 16, 1986.
Notice of Abandonment dated Jun. 23, 2010 for U.S. Appl. No. 11/240,905.
Restriction Requirement dated Mar. 22, 2007 for U.S. Appl. No. 11/240,905.

* cited by examiner

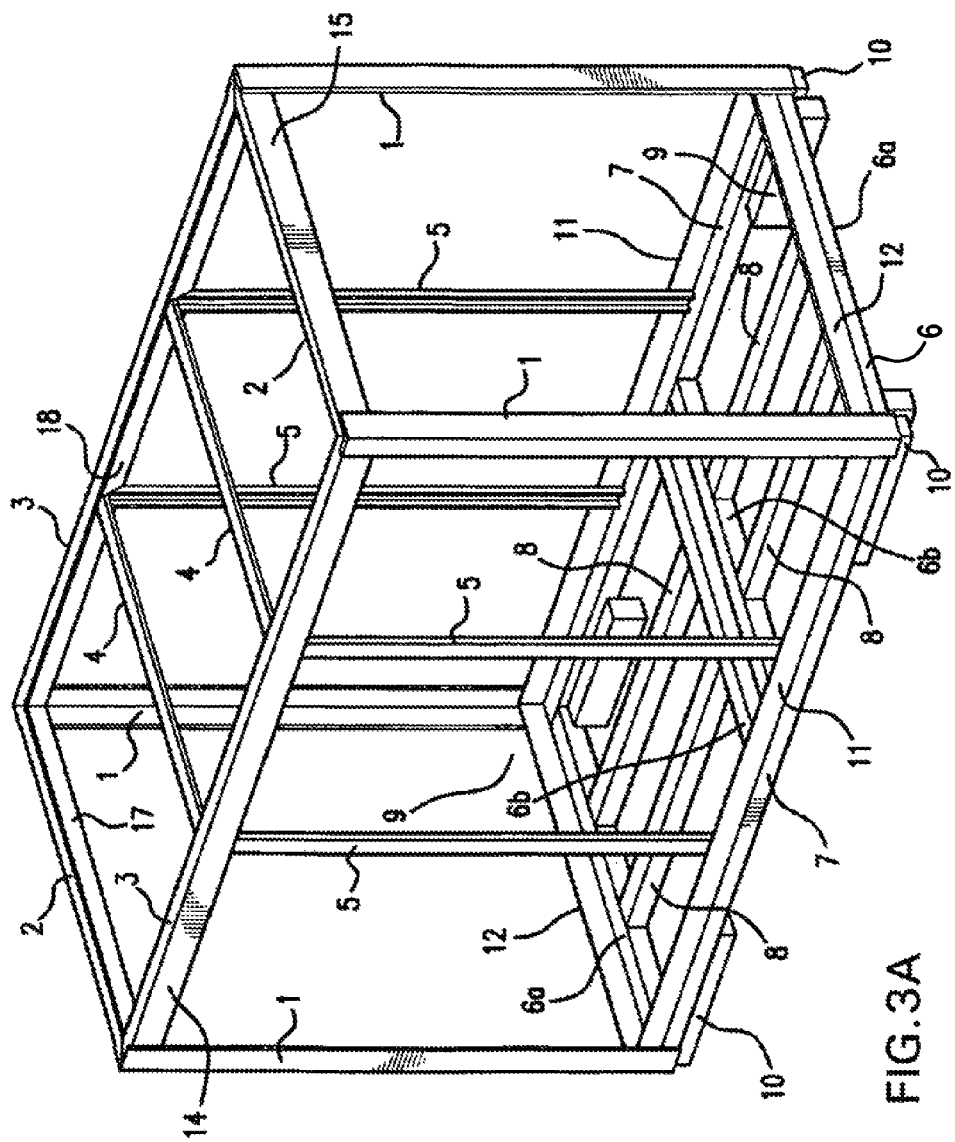

TREATMENT OF WOOD FOR THE PRODUCTION OF BUILDING STRUCTURES AND OTHER WOOD PRODUCTS

STATEMENT OF RELATED APPLICATIONS

The present application is a continuation of patent application Ser. No. 11/240,905, filed Sep. 30, 2005, now abandoned which claims priority under 35 USC 119(e) from U.S. provisional application Ser. No. 60/614,807, filed Sep. 30, 2004, entitled "Methods and Products for Treating Wood and Wood Products Made Therefrom." The disclosures of patent application Ser. No. 11/240,905 and of provisional patent application 60/614,807 are hereby incorporated by reference in their entirety herein.

FIELD OF INVENTION

The present invention relates to treated wood products, and to methods, devices, compositions, and systems for treating wood.

BACKGROUND

Building structures, such as windows and doors, that are made using real wood have a pleasing appearance and a substantial and solid feel. While the appearance of natural wood is aesthetically pleasing, wood can be susceptible to damage caused by long-term exposure to humid or dry air, moisture, weather, fungal infestation, and/or insect pests. Thus, frequent and often costly maintenance can be required to prevent the deterioration of finished wood that is exposed to the environment.

Also, wood is a valuable natural resource. To maximize the efficiency of using lumber for the production of building structures, lumber that has been cut to a size that is smaller than the final part may be used to form a larger piece. For example, small pieces of wood that may be left over from trimming a large panel or beam may be assembled as part of a larger building structure.

To enhance the ability of real wood to resist deterioration such as that caused by weather and/or insect pests, formulations to preserve and protect wood and methods of treating wood with such formulations have been developed (see e.g., U.S. Pat. Nos. 6,686,056; 6,569,540; 6,274,199; 5,824,370; 5,652,023; and references cited therein). Treatment of wood with such preservative formulations may result in additional steps that need to be incorporated into the overall manufacturing process. For example, treatment of wood with a preservative formulation may require drying the wood to a particular moisture content either before or after treatment. Or, treatment of wood with a preservative formulation may require pretreatment of the wood to enhance penetration of the preservative formulation into the pores of the wood. Also, wood products made from smaller pieces may need to be glued together either before or after being treated.

Thus, there is a need to increase the efficiency of processes used to make wood that has been chemically treated. Also, there is a need to improve upon the formulations used in the manufacture of wood products and building structures that use treated wood.

SUMMARY

Embodiments of the present invention provide methods, as well as compositions and devices, for treating wood. Also provided are systems for the treatment of wood. In yet another embodiment, the present invention provides novel wood products made using the methods and systems of the present invention and/or the devices and compositions of the present invention. The present invention may be embodied in a variety of ways.

For example, an embodiment of the present invention may comprise a device comprising a container for treating a plurality of wood pieces with a liquid. In an embodiment, the container may comprise a moisture exchange container. The container may comprise a supportive framework for holding a plurality of wood pieces in the container, and at least one surface comprising a plurality of apertures, where the apertures comprise a size such that a fluid can pass through the apertures, but a substantial proportion of the plurality of wood pieces within the interior of the container do not pass through the apertures.

Embodiments of the present invention also comprise compositions for gluing wood. In an embodiment, the composition may comprise an adhesive comprising a polyvinylacetate (PVA) resin and an isocyanate cross-linking agent. The adhesives of an embodiment of the present invention may be used for untreated wood, or wood that is to be treated with a chemical formulation of interest.

Embodiments of the present invention also comprise methods for treating wood with a chemical formulation of interest. The method may comprise, for example, the steps of assembling a plurality of pieces of wood; placing the plurality of pieces of wood in a container, where the container comprises a supportive framework for holding a plurality of wood pieces in the container, and at least one surface comprising a plurality of apertures, where the apertures comprise a size such that a fluid can pass through the apertures, but a substantial proportion of the plurality of wood pieces within the interior of the container do not pass through the apertures; and exposing the plurality of wood pieces to conditions such that a fluid is added to, or removed from, the wood.

Embodiments of the present invention also comprise systems for treating wood with a chemical formulation of interest. The system may comprise, for example, a station for loading a container for treating a plurality of wood pieces with a liquid, the container comprising a supportive framework for holding a plurality of wood pieces in the container, and at least one surface comprising a plurality of apertures, where the apertures comprise a size such that a fluid can pass through the apertures, but a substantial proportion of the plurality of wood pieces within the interior of the container do not pass through the apertures. Embodiments of the system may further comprise a station for treating the wood pieces with a liquid formulation of interest. Also, in other embodiments, the system may comprise a station for removing excess moisture from the wood after the wood has been removed from the treatment station. The system may be used for production of wood products that are formed from a plurality of parts. Thus, embodiments of the system may also comprise a station for gluing at least a portion of the wood pieces together.

Yet other embodiments may comprise wood products made using the devices, compositions, methods and systems of the present invention.

Certain embodiments of the present invention may comprise various advantages. Using the devices, compositions, methods and systems of the present invention may comprise an increased efficiency in the production of treated wood. For example, a moisture exchange container of the present invention may be used for treating a diverse array of wood substrates and for the production of a variety of building structures. Using the moisture exchange container of the present invention may allow for treatment of a plurality of wood pieces regardless of the shape or size of the wood pieces.

Also, embodiments of the present invention may be used in treatment protocols in which the wood is exposed to high temperatures and or changes in pressure. For example, in an embodiment, a moisture exchange container of the present invention may be used for the treatment of wood with water-based, or organic chemical formulations. Thus, the moisture exchange container of the present invention may be used for production of wood products that require treatment with a fungicide, or a pesticide, or other types of chemical preservatives. Or, the moisture exchange container may be used where the wood does not need to be treated with a chemical formulation, but requires the addition or removal of moisture.

Embodiments of the present invention may also allow for flexibility in terms of allowing for smaller the wood pieces to be glued together at various points in the treatment process. For example, the wood pieces may be glued together prior to loading the wood into a moisture exchange container for treatment with a chemical formulation. Or, the wood pieces may be glued together subsequent to loading the wood into a moisture exchange container for treatment with a chemical formulation.

Embodiments of the present invention may also provide unique adhesive compositions. In an embodiment, the adhesive compositions of the present invention may be formulated to provide increased adhesion of wood pieces to each other. Such increased adhesion can be important for gluing pieces of wood together that are going to be subjected to physical stress. Such increased adhesion may also be important for wood that is chemically treated, as the chemical treatment of wood may at least partly inactivate the chemical groups in the wood that can participate in binding an adhesive. Thus, a stronger adhesive can be required where the wood is to be chemically treated.

The adhesive composition of embodiments of the present invention may also provide reduced curing time. A reduced curing time may be beneficial during production as gluing the wood pieces together can be a bottleneck in production.

Also, the adhesive of embodiments of the present invention may be formulated to provide reduced chalking. Reduced chalking can allow for the formation of a stronger seal as well as cleaner glue line between the two parts that are being glued together.

From the foregoing summary, it is apparent that an object of the present invention is to provide methods, devices, compositions and systems relating to the production of treated wood products. It is to be understood that the invention is not limited in its application to the specific details as set forth in the following description, figures and claims. The invention is capable of other embodiments and of being practiced or carried out in various ways.

DETAILED DESCRIPTION

Definitions

Figure 1:
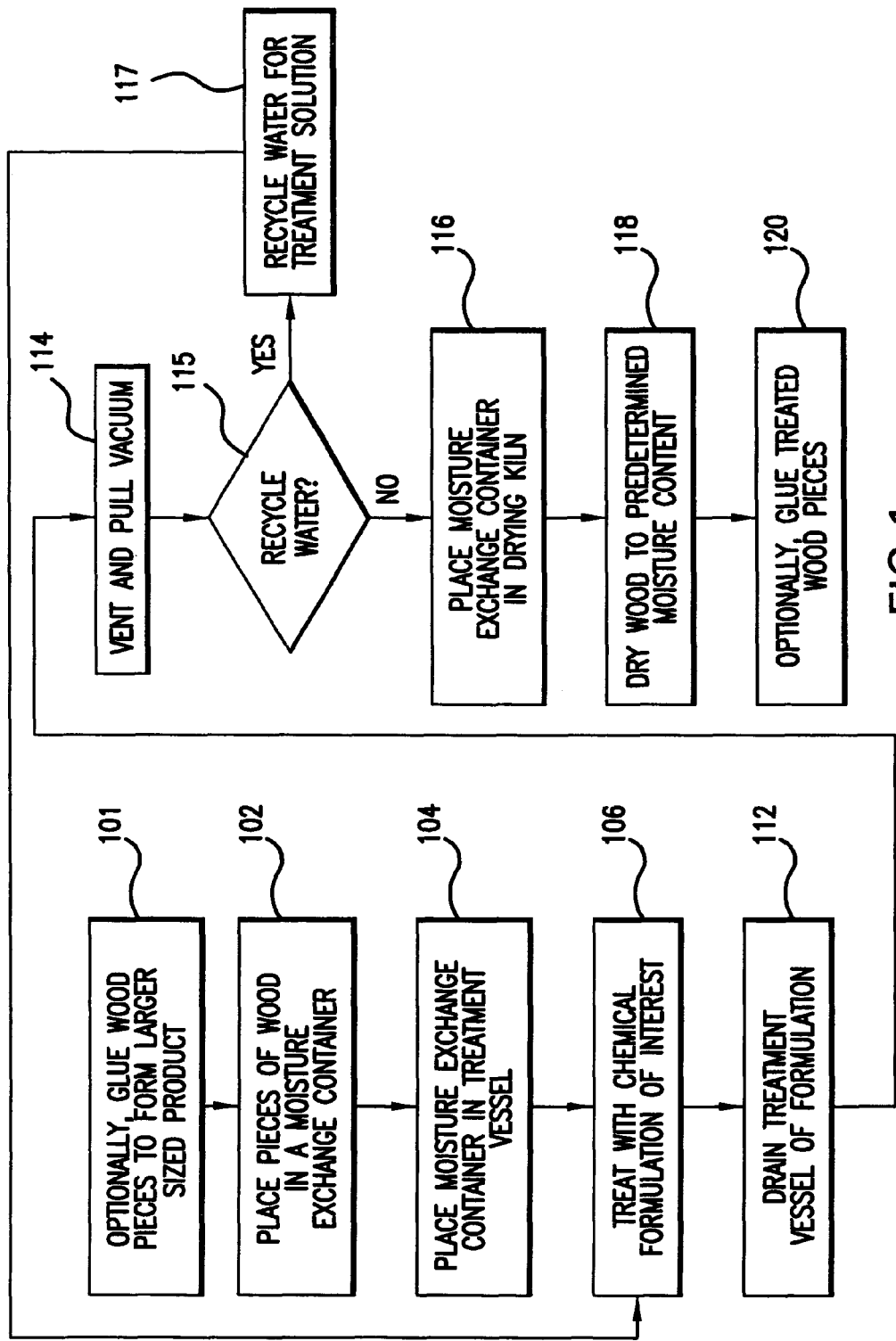
FIG. 1 shows a flow chart of a method used to treat wood products in accordance with an embodiment of the present invention.

As used in this specification, the singular forms "a," "an," and "the" include plural referents unless expressly and unequivocally limited to one referent.

As used herein, the term "a substantial proportion" means at least 60%, and therefore included ranges of at least 70%, or at least 80%, or at least 90%, or at least 95%, or at least 99%.

Embodiments of the present invention provide a variety of building structures comprising the treated wood products of the present invention. A building structure may be any one of a variety of building structures known in the art, such as, but not limited to, a door frame or a portion of a door frame, a window frame or a portion of a window frame, or a window part, such as a sash, glass stop or a simulated divided light (SDL) bar (e.g., a muntin), siding (or a portion thereof), decking (or a portion thereof), a facia board, a shutter, a shingle or a cladding. Also, the building structure may be a substantially planar structure such as a door panel. Or the treated wood may be further processed into a composite structure, such as a door skin.

As used herein, wood and pieces of wood include natural wood as well as wood-based composites. Such wood-based composites may include any lignocellulose fiber. For example, wood-based composites may include fiberboards such as high density fiberboard, medium density fiberboard, oriented strand board and particle board. The wood and wood pieces include a variety of different types of lumber such as industrial grade lumber, plywood, random length boards, clear cutstock lumber, fingerjoint cutstock lumber, ripped lumber, or other types of lumber suitable to make the wood product of interest. The type of wood is not limited to any particular species of wood. The wood may be a "hard wood," which are typically woods from dicotyledoous trees, such as cherry, ash, mahogany, troko, beech, oak, maple, birch, walnut, teak, alder, aspen, beech, cottonwood, elm, gum, poplar or willow. Or, a "soft wood," which are typically wood from coniferous trees such as larch, pine, fir, Douglas fir, hemlock, redwood, and spruce and may be used.

Also as used herein, a lignocellulosic fiber is a material containing cellulose, hemicellulose, and lignin. Suitable lignocellulosic materials may include wood particles, wood fibers, straw, hemp, sisal, cotton stalk, wheat, bamboo, jute, salt water reeds, palm fronds, flax, groundnut shells, hard woods, or soft woods. The lignocellulosic fiber used to make the wood pieces may be refined. As used herein, refined fiber is wood fibers and fiber bundles that have been reduced in size from other forms of wood such as chips and shavings. The refined wood fiber can be produced by softening the larger wood particles with steam and pressure and then mechanically grinding the wood in a refiner to produce the desired fiber size.

As used herein, a frame is a rigid supporting structure. Also, as used herein, a framework is an essential supporting structure that has at least one frame. Also, as used herein, feet are support structures upon which a larger structure may rest when placed on a flat surface.

As used herein, a mesh or a grid is a network structure comprising a plurality interlacing solid parts with regularly spaced apertures.

Embodiments of the present invention may comprise automated systems that may be controlled, at least in part, by a computer and a computer program or software. As used herein, a computer program includes a computer-encoded language that encodes the steps required for the computer to perform a specific task or tasks. Also, as used herein, software includes the computer program(s) used in conjunction with any other operating systems required for computer function. Computer-readable media include, but are not limited to, an electronic, optical, magnetic, or other storage or transmission device capable of providing a processor with computer-readable instructions. Other examples of suitable media include, but are not limited to, a floppy disk, CD-ROM, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, VISUAL C#®, VISUAL BASIC®, VISUAL FOXPRO®, Java, JavaScript, CITEC, WONDERWARE®, and TESTPOINT®.

Additionally, a used herein, a computer processor or CPU may include, for example, digital logic processors capable of processing input, executing algorithms, and generating output as necessary in response to the inputs received from an input device. Such processors may include a microprocessor, such as an ASIC, and state machines. Such processors include, or may be in communication with, media, for example computer-readable media, which stores instructions that, when executed by the processor, cause the processor to perform the steps described herein.

Methods for the Treatment of Wood

Embodiments of the present invention may comprise methods for the treatment of wood. Also, embodiments of the present invention comprise wood products made using the methods of the present invention. Embodiments of the methods of the present invention may comprise embodiments of the systems, devices, and compositions of the present invention as described herein.

In one embodiment, the present invention may comprise a method for treating wood comprising the steps of: (a) assembling a plurality of pieces of wood; (b) placing the plurality of pieces of wood in a container, wherein the container comprises (i) a supportive framework for holding a plurality of wood pieces in the container, and (ii) at least one surface comprising a plurality of apertures, wherein the apertures comprise a size such that a fluid can pass through the apertures, but a substantial proportion of the plurality of wood pieces within the interior of the container do not pass through the apertures; and (c) exposing the plurality of wood pieces to conditions such that a fluid may be added to, or removed from the wood. The framework may comprise a base frame, a top frame and a plurality of side rails connecting the base frame and the top frame.

Also, the container may, in certain embodiments, comprise feet extending from the base frame, so that when the container is placed on a flat surface, the container rests on the feet. The feet may be positioned to extend from the inner perimeter of the base frame such that when two containers are stacked, the feet from the upper container insert within the perimeter of the top frame of the lower container to restrict the containers from moving laterally with respect to each other. Also, the feet may comprise an extension, such that when the two containers are stacked, the extension of the feet from the upper container rests on the upper surface of the top frame of the lower container to provide a space between the two containers.

Also, in a embodiment, the frame may comprise a web or mesh. Or, a framework comprising larger apertures may be surrounded by a web or mesh. In an embodiment, the container may comprise a moisture exchange container as described herein. Other details of the moisture exchange container used in the methods of the present invention are discussed in detail below.

In an embodiment, the method may comprise treating a plurality of wood pieces with a chemical formulation and assembling the plurality of wood pieces into a larger structure. In one embodiment, the chemical formulation may comprise a preservative to protect the wood against water penetration and/or decay of the wood. Additionally or alternatively, the chemical formulation may comprise an agent to reduce insect attack. Or, the chemical formulation may comprise a fungicide. In yet another embodiment, the treatment may comprise adding or removing moisture to the wood.

The initial step of the method may, in certain embodiments, comprise preparing a plurality of wood pieces to be treated. The wood may comprise natural wood as well as wood-based composites. Also, the wood may comprise a variety of different types and grades of lumber such as industrial grade lumber, plywood, random length boards, clear cutstock lumber, fingerjoint cutstock lumber, ripped lumber or other types of lumber that may be used in the production of a building structure of interest. The type of wood is not limited to any particular species of wood. The wood may be a hard wood, such as cherry, ash, mahogany, troko, beech, oak, maple, birch, walnut, teak, alder, aspen, beech, cottonwood, elm, gum, poplar or willow. Or, a soft wood such as larch, pine, fir, Douglas fir, hemlock, redwood, and spruce and may be used.

In one embodiment, the wood may be loaded into a moisture exchange container of the present invention for transfer into a treatment vessel. The wood pieces may then be put in a treatment vessel. The treatment vessel may be a closed container that allows for the wood to be treated with the chemical formulation of interest. In one embodiment, the wood in the treatment vessel may be subjected to conditions of elevated temperature and/or pressure.

In an embodiment, after being treated, the wood may be placed in a dehumidifier or kiln to dry the wood to a predetermined moisture content. The kiln may be solar-powered, steam-heated, electric, or fired-wood or gas. In one embodiment, the wood may be air-dried at ambient temperatures. In alternate embodiments, the wood may be dried to have a final moisture content in the range of from about 3% to about 30%, or from about 5% to about 20%, or from about 8% to about 15%. The wood may remain in the moisture exchange container while in the kiln. The wood may be heated at a temperature ranging from about 30° F. (−1.1° C.) to 280° F. (138° C.), or from about 60° F. (15.6° C.) to about 240° F. (116° C.), or about 100° F. (37.8° C.) to about 220° F. (104.4° C.). Upon removal of excess moisture from the treated wood, the individual pieces of wood may be removed from the moisture exchange container.

The method of treating the wood may vary depending upon the type of formulation that is being applied to the wood. In one embodiment, the method may comprise altering the temperature and/or pressure as a means to increase penetration of a chemical formulation into the wood. Thus, in alternate embodiments, the step of exposing the plurality of wood pieces to a fluid comprises heating the wood and the fluid to a temperature ranging from about 110° F. (43.3° C.) to about 270° F. (132° C.), or from about 120° F. (48.9° C.) to about 250° F. (121° C.), or from about 130° F. (54.4° C.) to about 200° F. (93.3° C.), or from about 140° F. (60° C.) to about 180° F. (82.2° C.), or from about 150° F. (65.6° C.) to about 160° F. (71.1° C.). The treatment vessel may comprise a closed system that can apply either negative or positive pressure to the wood being treated. In one embodiment, the treatment vessel comprises an autoclave.

The wood pieces may be the size of the final product, or they may be small pieces that are glued together to form larger pieces. In one embodiment, the smaller pieces of wood may be glued together before the wood is treated with the chemical formulation of interest. Or, the wood pieces may be glued together after the wood has been treated with the chemical formulation of interest.

In one embodiment, the adhesive used to glue the wood comprises an adhesive comprising a polyvinylacetate (PVA) resin and an isocyanate cross-linking agent. The adhesive may comprise a bond strength allowing for treated wood to be glued, or for the wood to be glued prior to the treatment of interest. In alternate embodiments, the bond strength of the adhesive is greater than 1 Megapascal (MPa) (145 psi; 10.2 kg/cm$^2$), or 2 MPa (290 psi; 20.4 kg/cm$^2$), or 5 MPa (725 psi; 51 kg/cm$^2$), or 7.5 MPa (1088 psi; 76.5 kg/cm$^2$), or 10 MPa (1450 psi; 102 kg/cm$^2$), or 15 MPa (2175 psi; 153 kg/cm$^2$). For example, the bond strength of the adhesive may range from 1 MPa (145 psi; 10.2 kg/cm$^2$) to 20 MPa (2,900 psi; 204 kg/cm$^2$), or from 2 MPa (290 psi; 20.4 kg/cm$^2$) to 18 MPa (2,610 psi; 183.5 kg/cm$^2$), or from 5 MPa (725 psi) to 17 MPa (2465 psi; 173 kg/cm$^2$), or from 7.5 MPa (108 psi; 76.5 kg/cm$^2$) to 15 MPa (2175 psi; 153 kg/cm$^2$). For example, in alternate embodiments, the adhesive bond strength provides greater than 80%, or greater than 85%, or greater than 90%, or greater than 92%, or greater than 95%, or greater than 97% wood failure when the adhesive is used to bond two pieces of wood. In one embodiment, the measurement of bond strength comprises use of the ASTM tension and/or flexure tests as described herein.

As described in more detail below, the isocyanate cross-linking agent may comprise a diphenylmethane diisocyante (MDI). The MDI may comprise a mixture of polymeric MDI (pMDI) and pure MDI. The pure MDI may comprise 2,4' diphenylmethane diisocyante and 4,4'-diphenylmethane diisocyanate. The polymeric MDI may comprise a mixture of polymers as is known in the art. In an embodiment, the polymeric MDI may comprise a pure MDI as well as a tri-isocyanate, a tetra-isocyanate, a penta-isocyanate, and a small percentage of higher homologues. The average functionality of a polymeric MDI typically may range from about 2.5 to about 3.0. In an embodiment, the isocyanate cross-linking agent may comprise a methylene diphenyl diisocyanate (CAS 101-68-8). Additionally or alternatively, the isocyanate cross-linking agent may comprise a poly (methylene phenylene isocyanate) (CAS No.: 9016-87-9). The cross-linking agent may further comprise a methylene diphenylylisocyanate (CAS No.: 26447-40-5). In an embodiment, the poly(methylene phenylene isocyanate comprises about 45-55 wt. %. Also, the methylene diphenyldisocyanate may comprise about 40-50 wt %. Additionally, the methylene diphenylylisocyanate may comprise about 1-10%. In one embodiment, the cross-linking agent may comprise Isoset® CX-47, distributed by Ashland Specialty Chemicals Company (Ashland, Ohio). Or, in certain embodiments, other polymeric MDIs such as SUPRASEC® 5025 (Huntsman) may be used.

The polyvinyl acetate (PVA) resin may comprise a polyvinyl acetate polymer. Also, there may be other components in the PVA resin. For example, the PVA may comprise a polyvinyl alcohol. Also, the PVA resin may comprise a solvent such as an aromatic diester or phenol. In an embodiment, the PVA resin may comprise about 10 to 80% polyvinyl acetate, and about 5-15% polyvinyl alcohol. Additional components may include about 15-70% water, and about 1-5% of any other solvents. The PVA resin may also comprise a coalescent, such as ethylene glycol. Also, a stabilizer or filler, and a defoamer may be included. In certain embodiments, the PVA resin may comprise PVA 2723 or PVA 2720 (Specialty Polymers, Inc., Woodburn, Oreg.). PVA 2723 and PVA 2720 differ in that PVA 2720 does not include a coalescent.

In an embodiment, the method may comprise real-time mixing the two part formulation as part of a production line and applying the mixture to the wood upon mixing. For example, where the hybrid adhesive formulation of the present invention is used, there may be a first closed tube comprising the cross-linker (e.g., diphenylmethane diisocyanate) and a second closed tube comprising the PVA resin. In one embodiment, both parts of the adhesive (cross-linker and PVA resin) are pumped through the tubes, and mixed together in chamber under substantially air-tight (i.e., anaerobic conditions) immediately before application to the wood. In an embodiment, the two-part dispenser provides for controlled mixing of the two components (e.g., PVA and MDI) required for the adhesive. Also, in an embodiment, the closed nature of the dispenser may provide for reduced foaming as the MDI and the PVA resin react.

By using the moisture exchange container of the present invention, smaller pieces of wood may be treated with preservatives and other types of treatment formulations in a streamlined manner. Because the wood pieces treated using the moisture exchange container are relatively small in size, there may be increased penetration of the wood with the treatment formulation. Also, because the wood pieces being treated are relatively small pieces, the moisture content throughout the wood may be more consistent than wood that is dried as lumber or larger pieces. Wood made using the methods of the present invention may therefore comprise increased resistance to weathering, decay, insect pests, and moisture-induced shrinking and/or swelling as opposed to wood that is not treated.

Embodiments of Methods of Treating Wood

FIG. 1 provides a schematic overview of an example embodiment of a method of the present invention for treating wood. The treatment methods of the present invention may be used with a variety of wood substrates. In an embodiment, the size of the lumber treated is not limited by the method of the invention. In various embodiments, the lumber may range from pieces as small as 4 inches in length up to pieces that are about 20 feet (6.1 meters (m)) long or more. Also, the width of the lumber may vary as required by the final products to be made. In one embodiment, the lumber may range from about ½ inch (12.7 millimeter (mm)) to about 12 inches (304 mm)

or more in width. The thickness of the lumber may also vary. Varying the thickness of the lumber may require adjusting the treatment parameters, as thicker lumber may require a more extensive treatment (i.e., for longer times or at higher temperatures) than thinner pieces of lumber. In alternate embodiments, the lumber may range from about 1/16 inch (1.6 mm) to about 12 inches (304 mm) in thickness, or from about 1/8 inch (3.175 mm) to about 5 inches (122 mm) in thickness, or from about 1/4 inch to about 3 inches in thickness. In one embodiment, lumber of any dimension to fit in the moisture exchange container and/or treatment vessel may be used.

In alternate embodiments, the treated wood may be glued either before the treatment of the wood 101, or after the wood has been treated 120 (FIG. 1). In this way smaller pieces of wood may be treated and glued to form wood pieces that are commercially marketable products. For example, multiple pieces of fingerjoint cutstock may be glued together to form longer boards. When the wood pieces are glued together prior to being treated, the wood may be either placed in the moisture exchange container, or the larger wood pieces may be stacked and placed in the treatment vessel. If the moisture container is not used, spacers may be used between each piece of wood to allow for air flow and to aid in drying of the wood. In one example embodiment, the spacers may be stickers that are placed between alternate pieces of wood in a stack. The spacers may be placed between the wood either prior to the treatment step or after treating the wood. In one embodiment, gluing the wood prior to treatment may comprise use of an adhesive of the present invention comprising a polyvinyl acetate (PVA) resin and an isocyanate cross-linker.

Referring to FIG. 1, in one embodiment of the present invention, the wood substrate to be treated may be placed in a moisture exchange container ("MEC") of the present invention 102. A moisture exchange container may comprise an open walled container comprising at least one surface having a plurality of apertures. The moisture exchange container may be designed to hold a plurality of wood pieces. The wood pieces may be placed in the exchange container in a random manner or in an organized manner. Placement may be made such that there is sufficient spacing between the wood pieces so that the treatment formulation is able to coat each piece of wood in the container. The container may be designed to facilitate moisture exchange while providing substantial support on the bottom and the sides of the moisture exchange container to hold the wood. For example, as described in detail below, mesh wiring may be used as part of the container bottom and sides to provide support for the wood while still allowing flow of the treatment formulation into and out of the container, and around the wood pieces.

In an embodiment, once the wood has been placed in the moisture exchange container, the moisture exchange container may be positioned in the treatment vessel to be treated with the chemical formulation of interest 104 (FIG. 1). In one embodiment, if the wood is glued prior to treatment, the moisture container may not be required, and the wood may be stacked, and then placed in the treatment vessel. The treatment vessel may comprise a vessel in which treatment of the wood with a treatment solution of interest may occur. The treatment vessel may comprise a closed container that may be placed under pressure or held under vacuum. In one embodiment, the treatment vessel may comprise an autoclave. For example, the treatment vessel may comprise an autoclave having an inner volume that is about 78 inches in diameter and about 84 feet long.

Still referring to FIG. 1, once the wood has been loaded into the treatment vessel, the wood may be treated under conditions such that a fluid may be added to, or removed from, the wood 106. For example, the treatment may comprise adding a water-based formulation to the pores of the wood. Or, the treatment may comprise adding an organic formulation to the pores of the wood. The treatment solution may comprise a variety of agents to facilitate permeation of the wood by the active ingredients. For example, the treatment solution may include a surfactant or an emulsifier.

The treatment formulation may comprise a variety of active ingredients. In one embodiment, the treatment formulation may comprise a preservative. Or the treatment formulation may comprise a fungicide. Or, a fire retardant may be added. In yet another embodiment, the treatment formulation may comprise a pesticide. Or, the treatment formulation may comprise a water repellant (e.g., a wax emulsion), as a means to increase the water resistance of the wood.

Thus, the treatment formulation may comprise at least one of water, a wax, a surfactant (i.e., nonionic, anionic, amphoteric), an oil, a fungicide, an insecticide, a preservative, a pesticide, a fire retardant, or water repellant as is known in the art. Examples of wood preservatives that may be used include chromated copper arsenate, borates, azoles, triazoles, alkaline copper, alkaline copper quaternary salts, alkaline copper zinc arsenates, tebuconazole, quaternary ammonium compounds, isothiazolones, and carbamates. Such treatment formulations are described in U.S. Pat. Nos. 6,686,056; 6,569,540; 6,274,199; 5,824,370; and 5,652,023. In one embodiment, a treatment formulation for making commercial wood products such as those described in the above-referenced patents is used. The formulation may be applied in a manner as to substantially fill the treatment vessel.

In one embodiment, the wood may be subjected to a vacuum followed by a period under positive pressure to facilitate penetration of the wood with the treatment solution. For example, as described in U.S. Pat. No. 6,274,199, incorporated by reference in its entirety herein, the method of treatment may comprise subjecting the wood to a reduced or negative pressure sufficient to remove air from at least a portion of the cells in the wood, contacting the wood with the treatment formulation of interest, and applying a positive pressure to enhance penetration of the chemical formulation of interest into the wood. Also, in certain embodiments of the method, the temperature may be adjusted to maximize penetration of the wood. After a period sufficient for substantial penetration of the wood by the treatment formulation, the positive pressure in the vessel may be released, and any excess (i.e., nonadsorbed) treatment solution may be removed from the vessel. The pressure in the vessel may then be further reduced below atmospheric pressure. Pulling a vacuum in the treatment vessel may help to remove at least some of the moisture remaining in the wood after treatment with the preservative formulation.

The application of a vacuum may, at least in part, remove air from cells in the wood substrate. The vacuum may be applied as dictated by the treatment conditions (e.g., the temperature used for treating the wood, the elevation of the treatment facility, and the type of wood). The amount of time for which the vacuum is applied may depend on a variety of factors such as, but not limited to, the amount of wood being treated or the type of wood being treated. For example, the wood may be held under vacuum for a period of time of from about 1 minute to about 120 minutes, or from about 2 minutes to 60 minutes, or from about 5 minutes to about 30 minutes. Also, the vacuum may range from about −8 inches to about −29 inches (−203 millimeters (mm) to −737 mm) mercury, or from about −10 inches to about −25 inches (−254 mm to −635 mm) of mercury, or from about −13 inches to about −21 inches (−330 mm to −533 mm) of mercury. In one embodiment, the maximum vacuum achievable at the treatment temperature and elevation of the manufacturing plant may be used. For example, at an elevation of about 3,000 to 4,000 feet (914 meters (m) to 1,219 m), and a treatment temperature of about 160° F. (71.1° C.), a vacuum of about −18 inches (−533 mm) of mercury for about 5 minutes may be used.

In one embodiment, the formulation is applied while the treatment vessel is still under at least a partial vacuum, as the vacuum may facilitate pulling the treatment solution into the vessel. Alternatively, the treatment formulation may be applied to the wood in the treatment vessel after the vacuum has been released.

In an embodiment, once the treatment formulation is in the treatment vessel, a positive pressure may be applied to force the treatment formulation into the cells of the wood substrate. The positive pressure may range, for example, from about 5 to 200 pounds per square inch (psi) (0.35 to 14 kg/cm$^2$). For example, various types of wood may require relatively higher or lower pressures for permeation of the wood with the treatment solution of interest. Also, the pressure may vary depending upon the formulation of the treatment solution used. In one embodiment, where the treatment facility is at an elevation of about 3,000 feet to 4,000 feet (914 m to 1,219 m) above sea level, a pressure of about 150 psi (10.55 kg/cm$^2$) may be used.

The temperature may also be varied to promote penetration of the wood with the formulation of interest in certain embodiments of the method. The temperature used may depend, at least in part, on the formulation being used. For example, for a formulation that contains wax or an oil, a higher temperature may facilitate penetration of the wood cells with the wax or oil. In one embodiment, the temperature chosen allows for a wax to remain molten as it enters the cells of the wood. Also, the temperature may vary depending upon the elevation of the treatment facility. The temperature may range, in certain embodiments, from about ambient temperature to about 200° F. (93.3° C.). In one embodiment, a temperature of about 150° F. to 160° F. (65.6° C. to 71.1° C.) is used.

The time that the wood is treated under pressure with the formulation may vary depending on a variety of factors including, but not limited to, the pressure used to enhance penetration into the wood, the type of wood being treated, the size of the wood pieces being treated, and the type of formulation being used to treat the wood. The treatment time may range, for example, from 5 minutes to 24 hours or more. Alternatively, the time of treatment may range from about 20 minutes to 180 minutes. In one example embodiment, the time of treatment is about 60 minutes.

In an embodiment, after the wood has been treated, and if required, the pressure released, the treatment vessel may be drained of the treatment formulation 112 (FIG. 1). At this point, if the formulation used was water-based, the wood may have an excess of the water in the cells of the wood and/or coating the surface of the wood. It may therefore be beneficial to apply a vacuum to the wood to remove at least part of the water from the wood (114). In one embodiment, a vacuum ranging from about −13 to about −20 inches of mercury may be applied for about 0.5 hour.

Even with application of a vacuum to remove excess moisture, there may, in certain embodiments, be a need to remove additional moisture from the treated wood. To remove any additional moisture, the treated wood may be transferred to a dry kiln, oven, or other type of dehumidifier 116. Alternatively, the wood may be left in the moisture exchange container and dried at ambient temperature indoors or outdoors. In an embodiment, the wood may be left in the moisture exchange container during the drying step. Alternatively, the wood may be transferred to a different container for drying. In another embodiment, the wood may be directly loaded into the kiln, and spacers may be used to separate the wood pieces to facilitate drying.

The size of the kiln may be varied depending upon the production requirements. For example, in one embodiment, for mass production of a single wood species or a plurality of wood species, the kiln may be sized to dry approximately 21,000 cubic feet of wood. Or, the kiln may be as small as 80 cubic feet thereby allowing different drying protocols to be used for smaller batches of wood. In one example embodiment, a kiln having an internal volume of about 3,000 cubic feet is used.

The temperature in the kiln may, in certain embodiments of the method, be set so that the dried wood comprises a defined final moisture content 118. In one example embodiment, the kiln may be ramped to various temperature settings during the drying cycle as is known in the art. Both the temperature of the kiln and the moisture level inside the kiln may be controlled. The drying schedule may depend, in part, on the nature of the treatment solution used, the type of wood being treated, the external humidity, and the desired final moisture content to be achieved for the wood being treated. In one example embodiment, the kiln may be ramped up to about 100° F. to 155° F. (37.8° C. to 68.3° C.) and then the temperature in the kiln may be set to operate, with multiple set points, in the range of about 100° F. to 180° F. (37.8° C. to 82.2° C.), such that after about 50 to about 180 hours, the wood may be dried to a final moisture content of about 5% to about 20%. For high temperature drying, the kiln may be heated to 280° F. (138° C.). In one embodiment, the wood remains in the kiln at a temperature of about 140° F. to 160° F. (60° C. to 71.1° C.) for about 136 hours to provide a final moisture content in the range of about 5% to about 15%.

The drying step may be shortened by use of wood that is still warm from the treatment vessel. Thus, in one embodiment of the present invention, wood in the moisture exchange container may be transferred directly from the treatment vessel to the kiln. The rapid transfer of wood from the treatment vessel to the kiln may minimize cooling of the wood at this stage. If the wood is still warm from being treated, warming up the kiln may take substantially less time then when wood that has been allowed to cool is dried in the kiln. When wood is transferred directly from the treatment vessel to the kiln, the warm-up time for the kiln may be reduced by about 50 to 100 percent.

In one embodiment, the system is a closed system. In this way, there may be recycling of at least part of the resources used for the treatment of the wood. For example, water used to make the treatment formulation or recovered from the dried wood may be recycled. Again referring to FIG. 1, in one embodiment, a decision 115 may be made whether to recycle water used in the process. For example, where recycling of the water is desired, the unabsorbed treatment solution may be recovered from the treatment vessel and reused 117. The excess treatment solution recovered from the treatment vessel after treatment of the wood may comprise primarily water along with a reduced proportion of some of the other ingredients used in the treatment formulation. In one example embodiment, the recovered treatment solution may be diluted by more than 50%. The recycled treatment solution may be filtered and then mixed with newly prepared treatment solution to be used for treating subsequent batches of wood. Alternatively, the recycled treatment solution may be concentrated, with the evaporated water again recycled for use in the system.

Water evaporated from the wood as the wood is dried in the kiln may also be recycled. In one example embodiment, water that evaporates from the wood during the drying step may be isolated, filtered, and then used for preparing new treatment formulation. In one example embodiment, the system may comprise two 15,000 gallon water tanks: one with fresh water and one with recycled water.

The time for the total cycle (e.g., steps 101-118 or 102-120 of FIG. 1) may range from about 10 minutes to several days. In one example embodiment, the cycle takes about 140 minutes.

As illustrated in FIG. 1, in alternate embodiments, the treated wood may be glued either before the treatment of the wood 101, or after the wood has been treated 120. There may be some advantages to gluing the wood after it has been treated with the chemical formulation of interest. By gluing the wood after the wood has been treated, as opposed to before the wood has been treated, a number of advantages may be realized. First, scheduling of the gluing step may present a bottleneck in the production process as the amount and type of larger pieces required may be based on customer demand. By putting the gluing step at the end of the manufacturing process, the steps of treating the wood may proceed unhindered. Thus, by treating the wood first and gluing smaller pieces to form a larger product after the treatment, the turnaround time between receiving an order and shipping the final product may be reduced, resulting in increased responsiveness to customer demand.

Also, the elevated temperatures used for treating the wood may lead to at least partial decomposition of many adhesives used for wood. By gluing the wood after the wood has been treated, the adhesive is not exposed to the relatively harsh conditions used for treating the wood. Also, any moisture-induced swelling and shrinking that the wood may undergo during the treatment cycle may result in additional stress at points where the wood has been glued together. Gluing the wood pieces together after the wood has been treated may reduce the physical stress on the glued joints due to the treatment conditions. There may therefore be less need for specialized adhesives that can withstand the elevated temperature and chemicals used during treatment of the wood.

Also, as many adhesives comprise thermoplastic compounds, the glue may soften as a result of the elevated temperatures used during the treatment and subsequent drying of the wood. Thus, the adhesive may have reduced strength as the wood product comes out of the kiln. This can result in the need for additional "set" time prior to removing the product from the kiln to allow the wood to cool and the adhesive to set or harden.

Additionally, the adhesives used to glue the smaller wood pieces together may act as a barrier to the transfer of moisture. Thus, when wood is glued prior to being placed in the kiln, the adhesive may hinder drying of the wood. By gluing the wood after the wood has been treated, there may be reduced barriers to the removal of water. Also as wood dries more easily out the end of the grain (i.e., longitudinally) as compared to tangentially or radially (i.e., along the sides), shorter wood that has more grain ends exposed per unit weight may dry faster. Drying smaller pieces of wood that have not been glued together may therefore provide for a more consistent moisture content throughout the wood. By gluing the wood after it has been treated, there may be reduced deformation such as bowing, cupping, and warping of assembled wood products.

Devices for the Treatment of Wood

In other embodiments, the present invention may comprise devices for the treatment of wood. Also, embodiments of the present invention comprise wood products made using the devices of the present invention. Embodiments of the devices of the present invention may comprise embodiments of the methods, systems, and compositions of the present invention as described herein.

In one embodiment, the device may comprise a moisture exchange container for containing a plurality of pieces of wood during treatment to alter the moisture content or the chemical nature of the wood. For example, the wood may be subjected to the addition of moisture or the removal of moisture. Or, the wood may be treated with a liquid chemical formulation of interest.

The moisture exchange container of the present invention may be embodied in a variety of ways. In one embodiment, the container may comprise a supportive framework for holding a plurality of wood pieces in the container, and at least one surface comprising a plurality of apertures, wherein the apertures comprise a size such that a fluid can pass through the apertures, but a substantial proportion of the plurality of wood pieces within the interior of the container do not pass through the apertures. The framework may comprise a variety of shapes. For example, the container may be substantially cuboidal or rectangular in shape. Alternatively, the container may be substantially cylindrical in shape. Or, the container may comprise a trapezoid or pyramid type shape. In one embodiment, the framework may comprise a base frame, a top frame and a plurality of side rails connecting the base frame and the top frame.

In one embodiment, the container may comprise a rectangular shape. For a rectangular container, the supportive framework may comprise a rectangular frame comprising the base frame of the container; a rectangular frame comprising the top frame of the container; and four side rails connecting the base frame to the top frame, wherein the side rails extend perpendicularly from the base frame to the top frame to join a corner of the base frame to a corresponding corner of the top frame to form a rectangular-shaped container having a base, a top, and four sides.

In an embodiment, the framework of the container may provide the structural support for the container. In some embodiments, additional pieces may be provided to a basic framework. For example, additional side rails that connect the base frame to the top frame may be provided as part of the framework. The container may further comprise additional pieces as the base frame of the container, wherein the additional base frame pieces are interconnected to form a grid that extends from at least one side of the base frame to the opposite side of the base frame.

In an embodiment, the container may comprise a means to prevent the wood pieces from falling out of the top of the container. For example, in one embodiment, the side rails positioned along the length or the width of the container may connect to rails that extend along the top surface of the container. Or, the container may comprise a removable cover.

In certain embodiments, the moisture exchange container of the present invention may further comprise supports (e.g., feet) extending from the bottom frame. Thus, in one embodiment, the framework may comprise a first set of feet extending from the bottom of the framework so that when the container is placed on a flat surface, the feet support the container.

The feet may facilitate draining of the container. Additionally or alternatively, the feet may also facilitate stacking of multiple containers. In one embodiment, the feet are positioned to extend from the inner perimeter of the base frame such that when two containers are stacked, the feet from the upper container can insert within the perimeter of the top frame of the lower container. In this way, the feet from the upper container may restrict the containers from moving laterally with respect to each other. Also, the feet may comprise an extension, such that when the two containers are stacked, the extension of the feet from the upper container rests on the upper surface of the top frame of the lower container to provide a space between the two containers.

In certain embodiments, the feet may be further designed such that when two containers are stacked, there may be a space between the containers. In one embodiment, the container may comprise a second set of feet extending from the base frame of the container, such that when two containers are stacked, the second set of feet from the upper container rest on the upper surface of the top frame to provide a space between the two containers. For a rectangular container, and when two sets of feet are used, the feet may comprise four inner feet and four outer feet positioned at each corner of the container. Or, three inner and three outer feet may be used for a cylindrical container having two sets of feet. In one embodiment, the first set of inner feet project farther from the bottom surface of the container than the second set of outer feet.

In yet another embodiment, the feet may comprise a plurality bars that extend from one side of the container to the other side of the container. The bars may be designed so as to extend past the perimeter of the base frame. For example, 2 bars that extend along the width of the container and from one side of the container to the other side of the container may comprise the feet.

In certain embodiments, the moisture exchange container of the present invention may be designed to facilitate loading and unloading wood from the container. For example, the upper frame may comprise a surface designed such that wood pieces will not get caught on the frame. Thus, in an embodiment, the top frame may comprise a surface that is angled to facilitate sliding wood pieces in and out of the container. Thus, the top frame may, in certain embodiments, comprise at least one rail comprising a planar surface that is parallel to the top surface of the top of the container, a side rail comprising a planar surface that is parallel to the side surface of the container, and a surface that extends from the interior edge of the top rail to the lower edge of the side rail to provide a surface that is angled such that the interior perimeter of the container at the lower edge of the top frame is greater that the interior perimeter of the container at the upper edge of the top frame. In one embodiment, the top and side rail used to form the top frame may comprise a single L-shaped piece. The angled surface may then be used to connect the legs of the "L" to form a triangular shaped bar.

In certain embodiments, the container may be designed to facilitate exchange of a fluid into a plurality of wood pieces. In one embodiment, each of the side surfaces comprises apertures to facilitate the transfer of moisture. Or, at least two of the side surfaces may comprises apertures to facilitate the transfer of moisture and two of the sides may be solid. Or, all four sides may be solid. The bottom of the container may also comprise a plurality of apertures. In this way, moisture that is not taken up by the wood may drain out of the container. Thus, in one embodiment, each of the side surfaces and the bottom surface of the container comprise a plurality of apertures. In an embodiment, the apertures may comprise a mesh or a grid. In an embodiment, the framework itself is a mesh or grid. For example, in certain embodiments, the container may not have a rigid frame, but may comprise a rope or metal cable net.

Depending on the size of the wood to be treated, the apertures may comprise apertures that are part of the overall framework. Or, for treatment of smaller pieces of wood, the apertures may be provided by attaching a mesh or a grid to the surface of the framework.

As described herein, the treatment process may comprise exposing the wood to a chemical formulation. Additionally, the treatment process may comprise exposing the wood to high temperatures. For example, the container may be used to transfer wood (treated or untreated) to a kiln. In an embodiment, the container may be used to transfer untreated wood to a kiln for high temperature treatment at for example 180° C. to 240° C. Also, the treatment process may comprise exposing the wood to changes in pressure. In at least some embodiments, the moisture exchange container should be made of a material that can withstand exposure to the chemical treatment formulation at elevated temperatures, a positive pressure, or a vacuum. For example, in alternate embodiments, the moisture exchange container of the present invention is stable to exposure to temperatures of greater than 270° F. (132° C.), or 250° F. (121° C.), or 200° F. (93° C.), or 180° F. (82° C.), or 150° F. (65.6° C.).

Also, the moisture exchange container may be stable to exposure to organic chemical formulations, or aqueous chemical formulations, or ionic chemical formulations.

Embodiments of the moisture exchange container of the present invention may be formulated from metal. For example, metal tubing, or channel, or roll formed steel, may be used for the moisture exchange container of the present invention. The metal used may comprise mild steel, tube steel, stainless steel, high carbon steel, or other types of metal, such as iron or aluminum, that may be stable to the treatment solutions and conditions. Also, plastic may be used for at least some parts of the container. Also, to facilitate draining, at least a portion of the framework may comprise channel steel, wherein the sides of the channel extends towards the bottom surface of the container.

The moisture exchange container may comprise a carrier designed to facilitate the treatment and subsequent drying of fingerjoint cutstock and other smaller pieces of wood prior to fingerjointing or otherwise assembling the wood into larger pieces. In certain embodiments, the moisture exchange container may be designed to be of a size suitable for holding a plurality of pieces of fingerjoint cutstock lumber. Thus, the moisture exchange container may allow for transfer of bulk quantities of wood from a treatment vessel for treatment of the wood with a chemical formulation under conditions of high temperature and/or high pressure to a kiln for removing excess moisture from the treated wood without stacking and restacking of the wood. To use the moisture exchange container, wood to be treated may be randomly placed in the moisture exchange container. In one embodiment, there is no need for spacers or the like to separate the individual pieces of wood. By placing the wood in the moisture exchange container in a random manner, the ability of the wood to be impregnated with the treatment solution, and then dried to a predefined moisture content after treatment, may be increased. By using the moisture exchange container of the present invention, a more reproducible permeation of the wood with the treatment solution may result.

The moisture exchange container may be of a size to hold wood of the appropriate size and shape and to fit in the treatment vessel and/or kiln. In one example embodiment, the moisture exchange container may be about 90 and ¾ inches (2.305 m) in length, 55 and ¾ inches (1.416 m) high, and 48 inches (1.219 m) deep. In another example embodiment, the moisture exchange container may be about 128 inches (2.305 m) in length, 55 and ¾ inches (1.416 m) high, and 48 inches (1.219 m) deep).

Embodiments of Devices for Treating Wood

Figure 2:
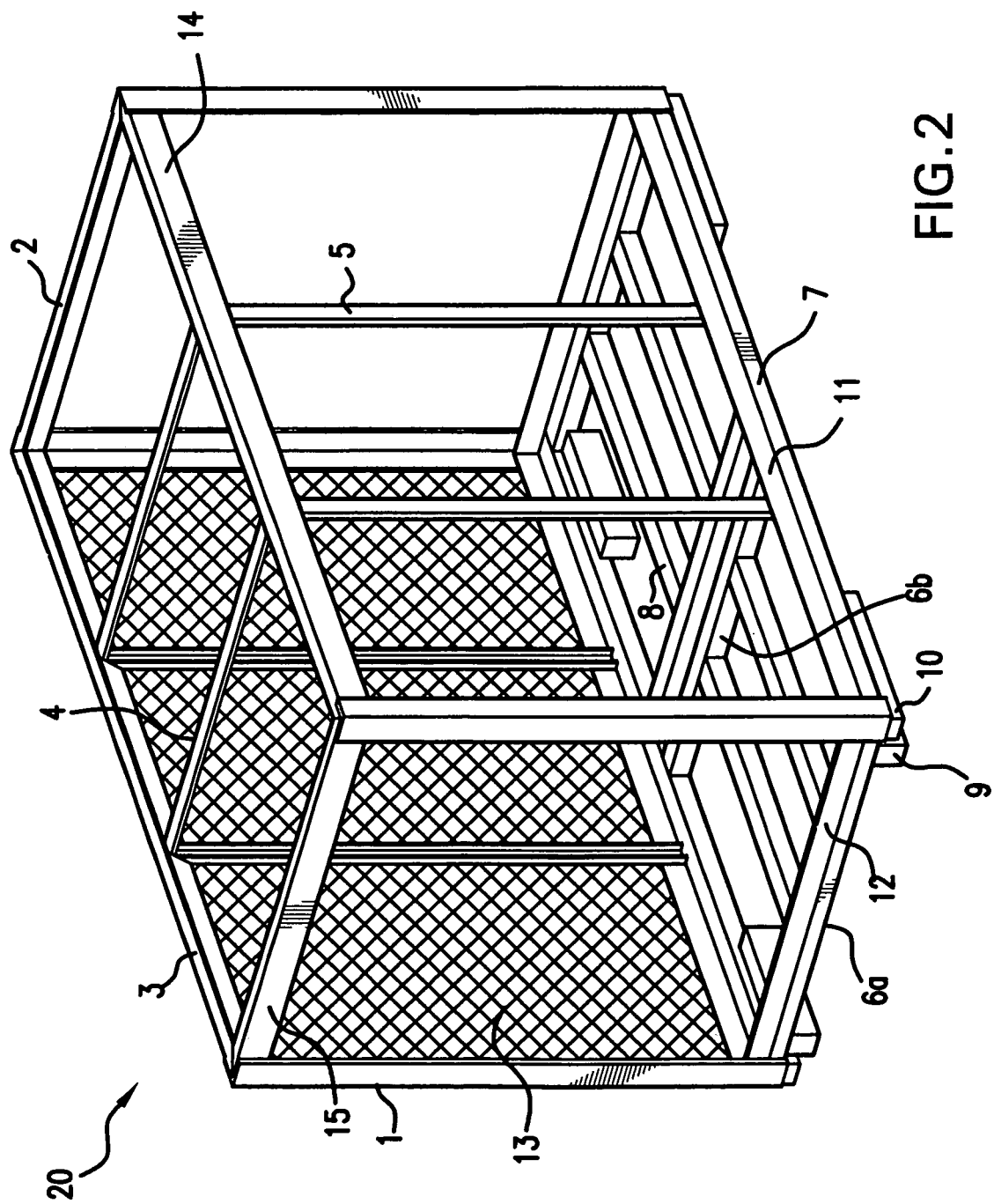
FIG. 2 illustrates a moisture exchange container in accordance with an embodiment of the present invention.
Figures 1, 3B:
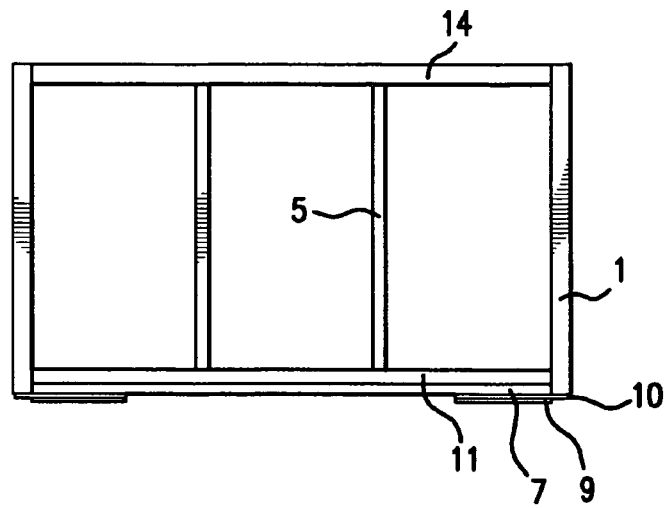
Figures 2, 3B:
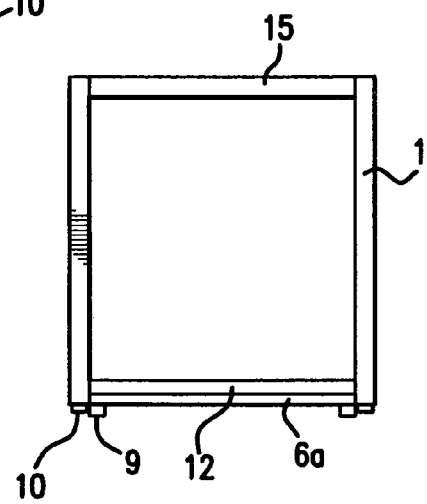
Figures 3, 3B:
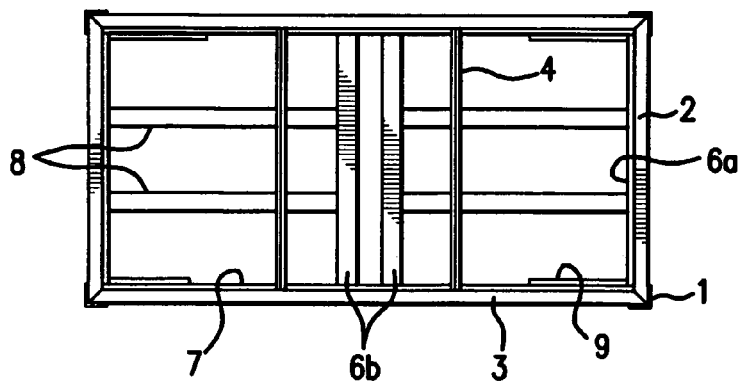
FIG. 3 panels A-E, illustrate additional drawing views and dimensions for a moisture exchange container in accordance with an embodiment of the present invention, wherein (3A) shows a perspective view of the container; 3B shows front and back views (3B-1), left and right side views (3B-2), and a top view (3B-3); 3C shows a view of the bottom of the container; 3D shows exploded views of the feet attached to the container as perspective views (3D-1, 3D-2) or a cross-sectional view (3D-3); and 3E shows perspective (3E-1) and exploded views of the top corner (3E-2) and central reinforcing bars (3E-2).
Figure 3C:
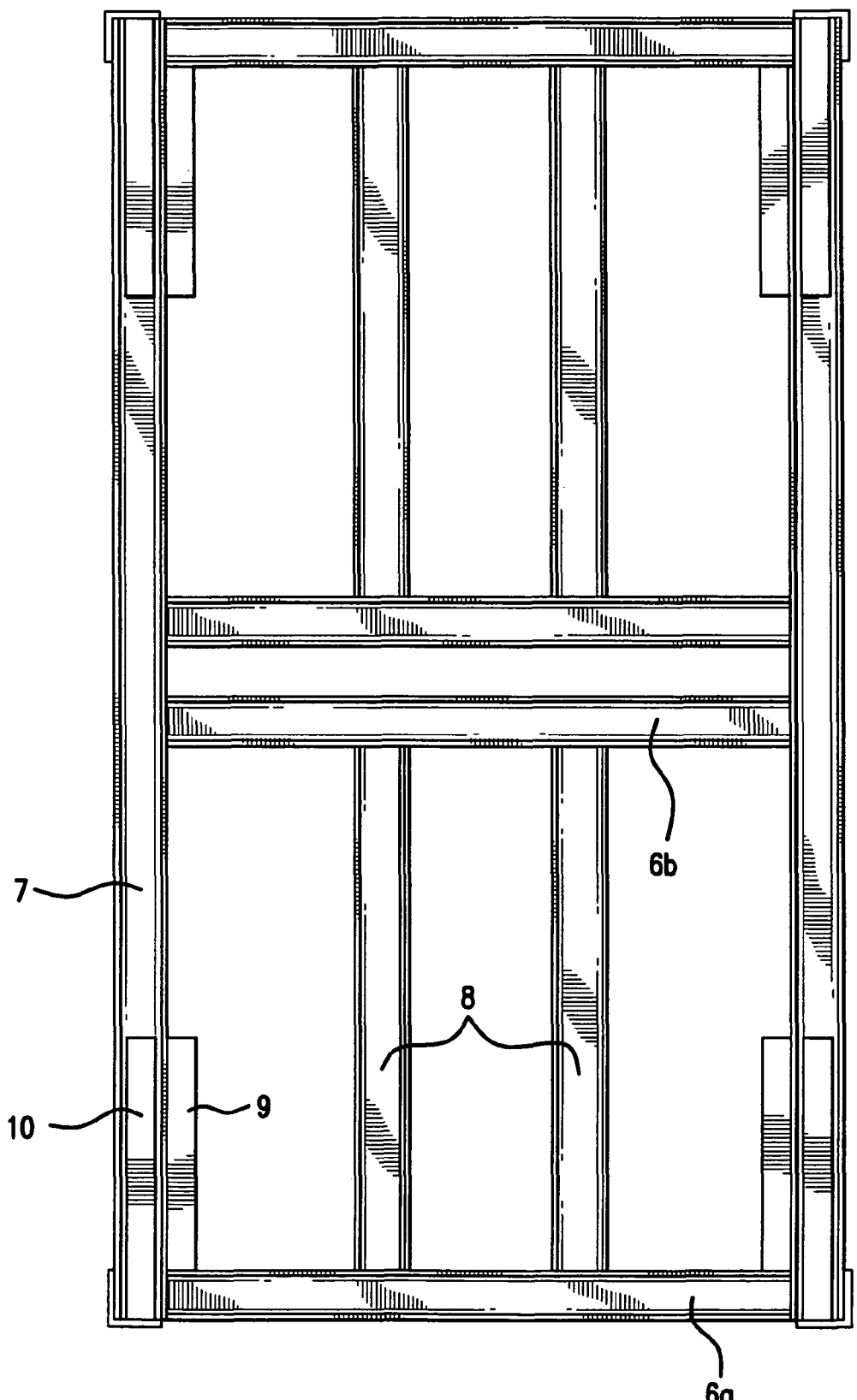

Example embodiments of a moisture exchange container 20 of the present invention are shown in FIGS. 2, 3A-3E, 4 and 5. As shown in FIGS. 2, 3A, 3B, and 3C, the moisture exchange container may comprise a framework formed of channel steel or the like. The base frame of the framework may comprise two single long pieces 7 comprising the length of the container and two shorter pieces 6 comprising the width of the container. The pieces 6 and 7 used for the bottom frame may comprise rolled steel or channel steel. Thus, in one example embodiment, base pieces 6 and 7 may comprise 3 inch by 3 inch by ¼ inch (76.2 mm by 76.2 mm by 6.25 mm) thick channel steel. Alternatively, base pieces 6 and 7 may comprise 2 and ⅜ inch by 3 inch by ¼ inch (60.325 mm by 76.2 mm by 6.25 mm) thick channel steel. Other types of materials, structural designs and/or dimensions may be employed depending upon the type of wood being treated and the conditions of treatment. For the bottom frame pieces 6 and 7, the channel may be positioned to face outwardly to facilitate draining of the treatment solution and other moisture from the container pieces. For example, FIG. 3C shows a view of the bottom surface of the base of the container (i.e., the bottom frame) comprising rolled or channel steel pieces 6a, 6b, and 7 and reinforcing bars 8 with the channel opening to the bottom surface in accordance with an example embodiment of the present invention.

As shown in FIGS. 2 and 3A, in an embodiment, the top surface of the container may comprise a top frame comprising long rails 3 extending the length of the container, and shorter rails 2 extending the width of the container. The top of the container may therefore comprise side rails 14 extending the length of the container, and shorter side rails 15 extending the width of the container. In one example embodiment, top rails 2 and 3 may be 2 inches by 3 inches by ¼ inch thick (50.8 mm by 76.2 mm by 6.35 mm) and side rails 14 and 15 may be flat bars, 2 inches by 3 inches (50.8 mm by 76.2 mm). Also, in some embodiments, the top rails 2, 15 and 3, 14 may comprise a single L-shaped piece. Other types of materials, structural designs and/or dimensions may be employed depending upon the type of wood being treated and the conditions of treatment.

In certain embodiments, the container of the present invention may be designed to facilitate adding wood into, or removing wood from, the container. In one embodiment, top rails 2 and 3 are joined to side rails 14 and 15 both along the outer edge of the container, and with an additional pieces 17 and 18 that are angled with respect to the plane of the upper surface of the container and the sides of the container. An example of the angled surface is shown in FIGS. 3A and 3E-2, showing the connection of side rail 5 and top rail 4 within the body of the rail created by top rail 3, side rail 14, and angled rail 18. Thus, in one embodiment, the top rail may comprise essentially a triangular shape with the hypotenuse of the triangle forming the interior surface of the frame.

In certain embodiments, the container may further comprise corner vertical supports 1 connecting the upper perimeter pieces (e.g., the top frame) and the lower perimeter pieces (e.g., the bottom frame). In one example embodiment, the vertical supports 1 may comprise 3 inch by 3 inch by ¼ inch (76.2 mm by 76.2 mm by 6.35 mm) thick steel corners that wrap around the top frame (i.e., 14 and 15) and lower frame (i.e., 6 and 7) perimeter pieces (FIG. 3E-1). Other types of materials, structural designs and/or dimensions for the vertical supports may be employed depending upon the type of wood being treated and the conditions of treatment. An enlargement showing an example of vertical supports 1 wrapping around top rails 3, 14 and 2, 15 is shown in FIG. 3E-2.

In certain embodiments, the container may be used to treat a substantial volume of wood pieces as a single batch. In alternate embodiments, the container may be loaded with from 100 to 15,000 pounds (45.4 kilograms (kg) to 6,804 kg) of wood, or from 100 to 5,000 pounds (45.4 kg to 2,268 kg) of wood. Thus, the container may, in certain embodiments, comprise additional reinforcing bars to hold the wood being treated. Referring now to FIGS. 2, 3A, 3B, and 3C, the container may comprise two bars 6b at the center portion of the base. In one example embodiment, the central support bars 6b may be welded to additional support bars 8 that run from each central support bar 6b to the outer perimeter support bar 6a. In one example embodiment, central support bars 6b and outer support bars 6a may each be made from 3 inch by 3 inch by ¼ inch (76.2 mm by 76.2 mm by 6.25 mm) thick rolled steel. Alternatively, central support bars 6b and outer support bars 6a may each be made from 2 and ⅜ inch by 3 inch by ¼ inch thick (60.325 mm by 76.2 mm by 6.25 mm) rolled steel. Other types of material, structures and/or dimensions may be employed for the bottom frame reinforcing bars depending upon the type of wood being treated and the conditions of treatment. Reinforcing bars 6b and 8 may provide additional support for the wood being held in the moisture exchange container.

Referring to FIGS. 2, 3A, 3B and 3E, in certain embodiments, the container may further comprise reinforcing pieces positioned along the sides and/or the top of the container. For example, vertical reinforcing bars 5 extending from the bottom frame perimeter bar 7 to the top frame perimeter bar 14 may be used. There may be a single vertical bar 5 per side or multiple bars along the length and/or width of the container. In one example embodiment, vertical bars 5 may comprise two inch by one inch by ¼ inch (50.8 mm by 25.4 mm by 6.25 mm) thick Junior channel steel with the channel positioned towards the interior of the container. Other types of material, structures and/or dimensions may be employed for the side reinforcing bars 5 depending upon the type of wood being treated and the conditions of treatment.

Embodiments of the container may also include reinforcing pieces 4 along the top of the container. As with the reinforcing bars used along the sides, there may be a single reinforcing piece 4 or multiple pieces along the length and/or width of the container. In one example embodiment, triangular tube steel, one inch by one inch by ¼ inch thick (25.4 mm by 25.4 mm by 6.25 mm) may be used. In one example embodiment, the triangular tubes may comprise two sides of three inches (76.2 mm), and a base of 2 inches (50.8 mm). In one embodiment, the triangular tubes may comprise a 45 degree angle on the top side of the rails. An enlarged view of the triangular tubes that may be used for the upper reinforcing pieces 4 is shown in FIG. 3E-3. Also, other types of bars, such as channel steel may be used. The tubes or bars may be welded, bolted, or riveted in place or attached by other means as in known in the art. Other types of materials, structural designs and/or dimensions may be employed for the top reinforcing bars 4 depending upon the type of wood being treated and the conditions of treatment.

The moisture exchange container may, in at least some embodiments, include a mesh or a grid 13 as part of the exoskeleton (FIG. 2). The mesh may be positioned on the bottom surface as well as on the sides to prevent the wood from falling out of the moisture exchange container. In one embodiment, 1 and ½ inch by 3 inch (25.4 mm by 12.7 mm by 76.2 mm) diamond mesh may be used. Other mesh sizes may be used depending on the size of the wood being treated. Depending upon the dimensions of the moisture exchange container, there may not be a need for mesh on the top surface of the moisture exchange container. For example, the moisture exchange container may be sized to fit tightly in the treatment vessel. In this way, there is little chance that wood will spill out of the top of the moisture exchange container.

To facilitate positioning of the mesh on the container, the container may, in at least some embodiments, comprise support bars or rails 11 and 12 extending up from the base of the container for attaching the mesh to the framework (FIGS. 3A and 3B). In one example embodiment, the support bars may comprise 2 and ½ inch by ¼ inch (63.5 mm by 6.35 mm) thick bars extending the length and/or the width of the container. Other specifications and/or dimensions may be employed for the support bars or rails 11, 12 depending upon the type of wood being treated and the conditions of treatment. Thus, in an example embodiment, the mesh on the sides of the container may be attached to the base or bottom support bars 11 and 12, and top or upper support rails 14 and 15. Mesh on the base may be positioned on the upper or lower surface of the framework formed by 6, 7 and 8, and welded at multiple points to each of these pieces.

In an embodiment, the container may comprise at least one side surface that is solid (i.e., not a mesh or grid). For example, a solid surface may be used for the two sides of the container (FIG. 5). Thus, a sheet metal may be attached to bars 1 and 12 on each side of the container. Or, a sheet metal may be attached to bars 1 and 11 on the front and back of the container. In an embodiment a ⅛ inch (3.17 mm) sheet metal panel may be used. In an embodiment, the use of a solid side may comprise additional support for the structure.

In certain embodiments, the container may further comprise supports (e.g., "feet") positioned on the base of the container. The feet may be used to support the base of the container on a flat surface while providing a space for liquids to drain from the bottom of the container. Also, the feet may provide an access for the prongs of a forklift to be inserted under the base of the container so as to allow for the container to be moved. In one example embodiment, the feet are positioned to facilitate stacking of the containers, while still allowing for the prongs of a forklift to be positioned underneath the base of the containers in the stack. For example, in one embodiment, the moisture exchange container of the present invention may comprise four outer feet 10 and four inner feet 9 (FIGS. 2, 3A-D, and 4). The inner feet 9 may be positioned on the inner surface of the perimeter of the bottom frame. Also, the outer feet 10 may be positioned to be in alignment with the base frame. For example, the outer feet 10 may be positioned within the channel of the base piece 7 (see e.g., FIGS. 3A, 3C, and 3D-1, 3D-2, and 3D3).

Figure 4:
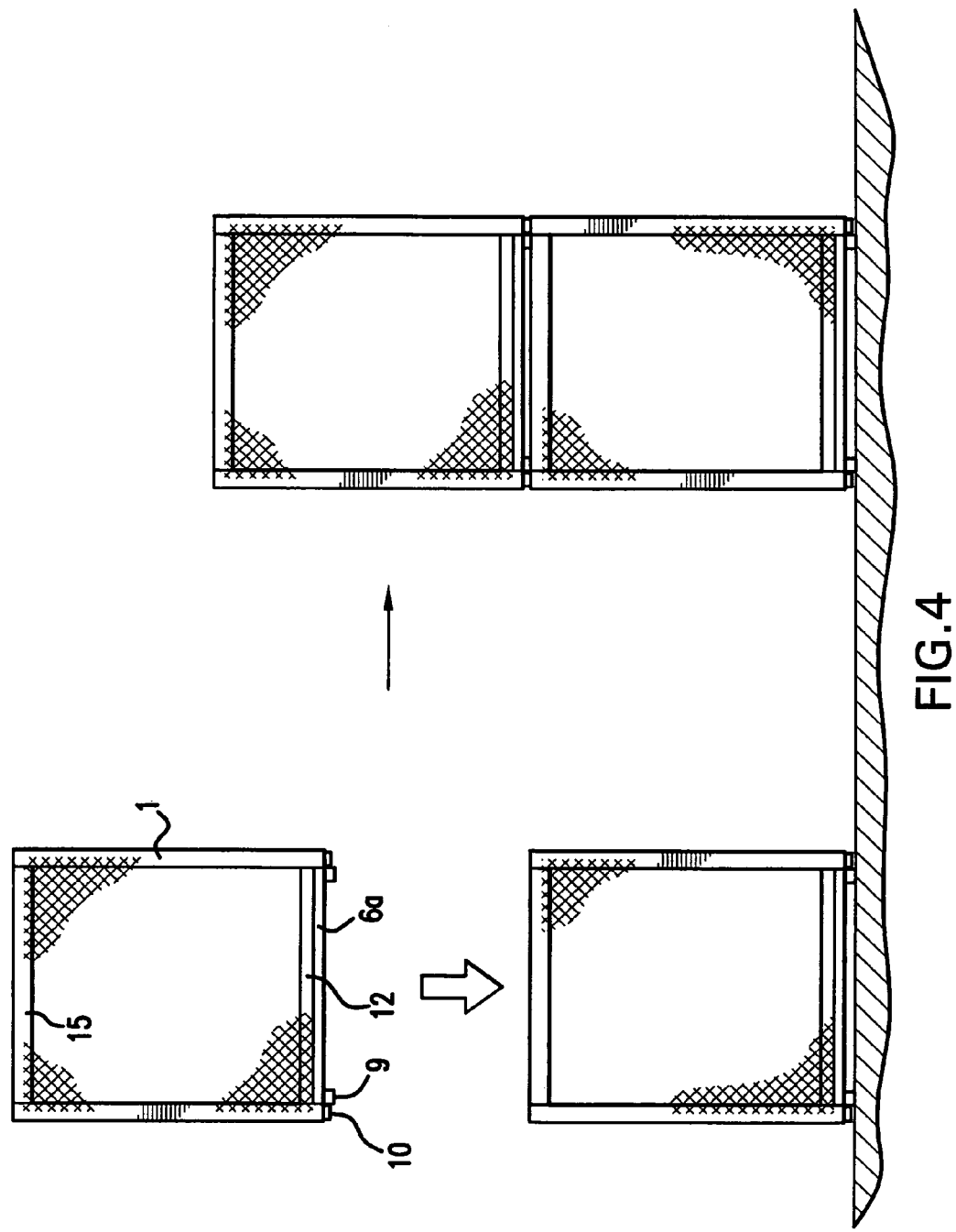
FIG. 4 shows stacking of two moisture exchange containers in accordance with an embodiment of the present invention.

FIG. 4 provides an illustration of an example embodiment of stacking of the moisture exchange containers of the present invention. In one embodiment, the inner feet 9 may be positioned to extend farther from the base than the outer feet 10. In this way, when the container is positioned on a flat surface, it will rest on inner feet 9 (FIG. 4). However, when the container is stacked on top of another container, it may rest on outer feet 10, with the inner feet sitting within the perimeter created by the top (i.e., upper) frame bars 2 and 15 running along the width of the lower container, and 3 and 14 running along the length of the lower container. When two containers are stacked in this manner, inner feet 9 may not rest on the lower container, but extend into the interior of the lower container. By having the feet 10 from the upper container rest on the bars of top frame 2 and 3 of the lower container, there may be a space 11 between the two stacked containers that allows for access to the bottom surface of the upper container (FIG. 4). For example, in one embodiment, the prongs of a forklift may be inserted into the space 11 between the two containers to allow for removing the upper container from a stack of containers.

Figures 1, 3D:
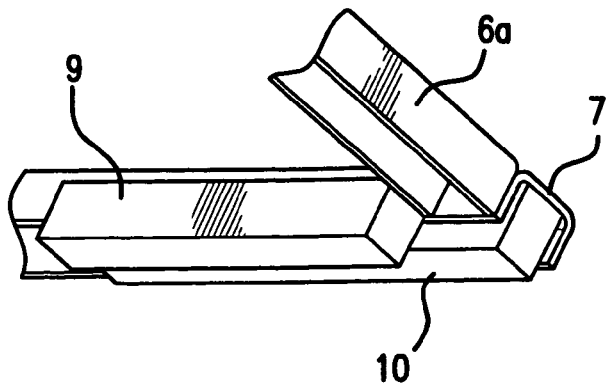
Figures 2, 3D:
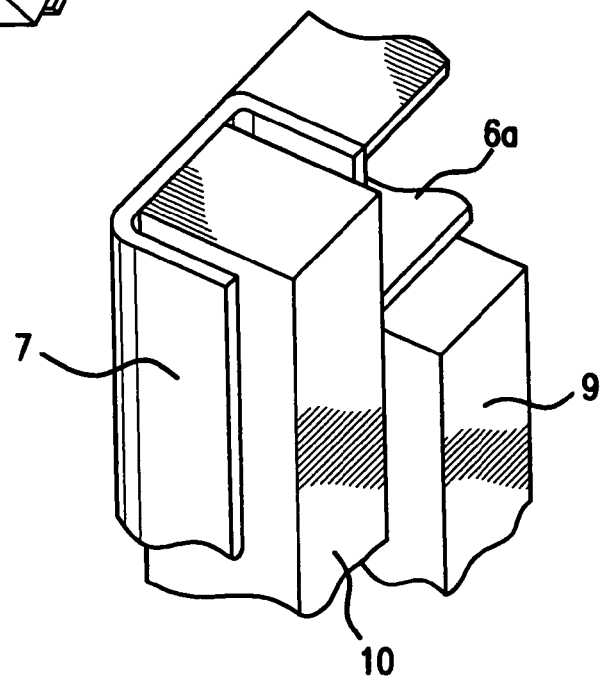
Figures 3, 3D:
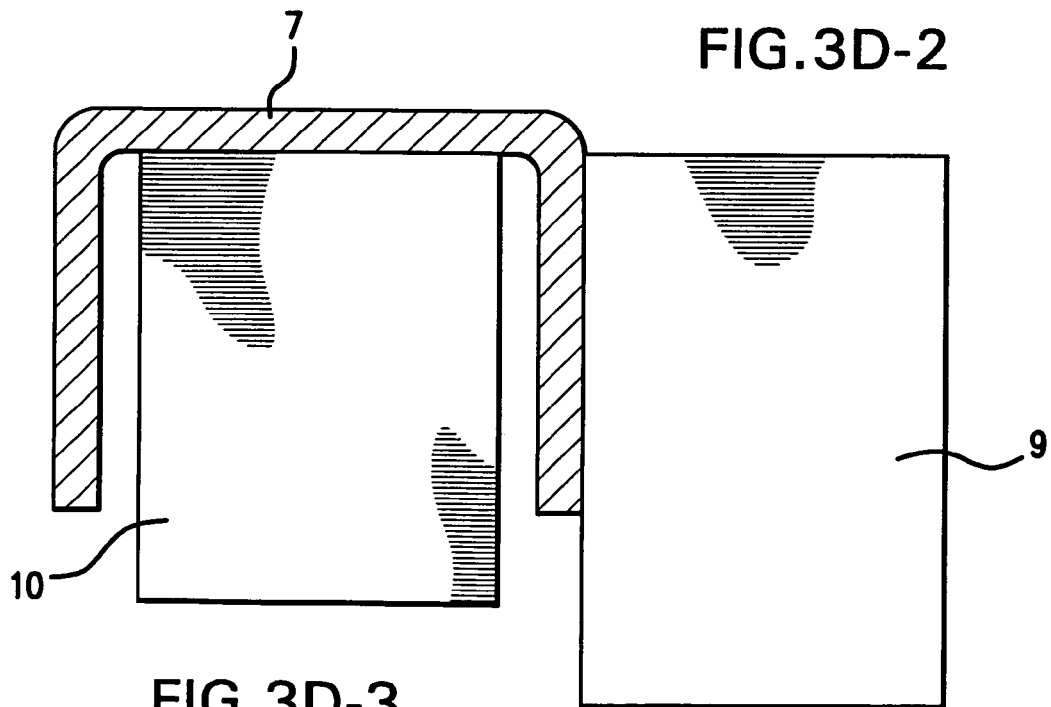
Figures 2, 3E:
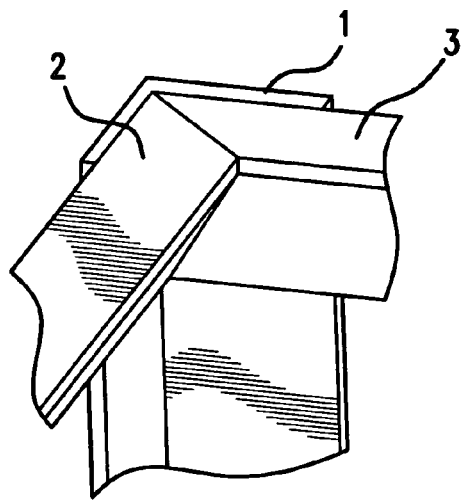
Figures 3, 3E:
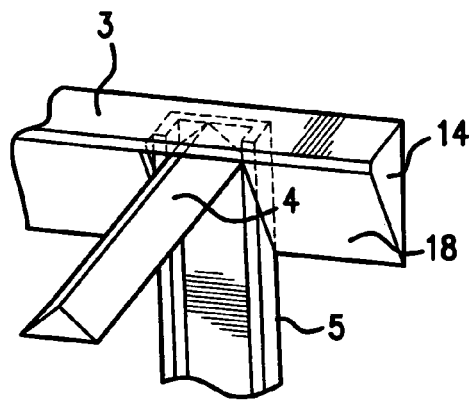
Figures 1, 3E:
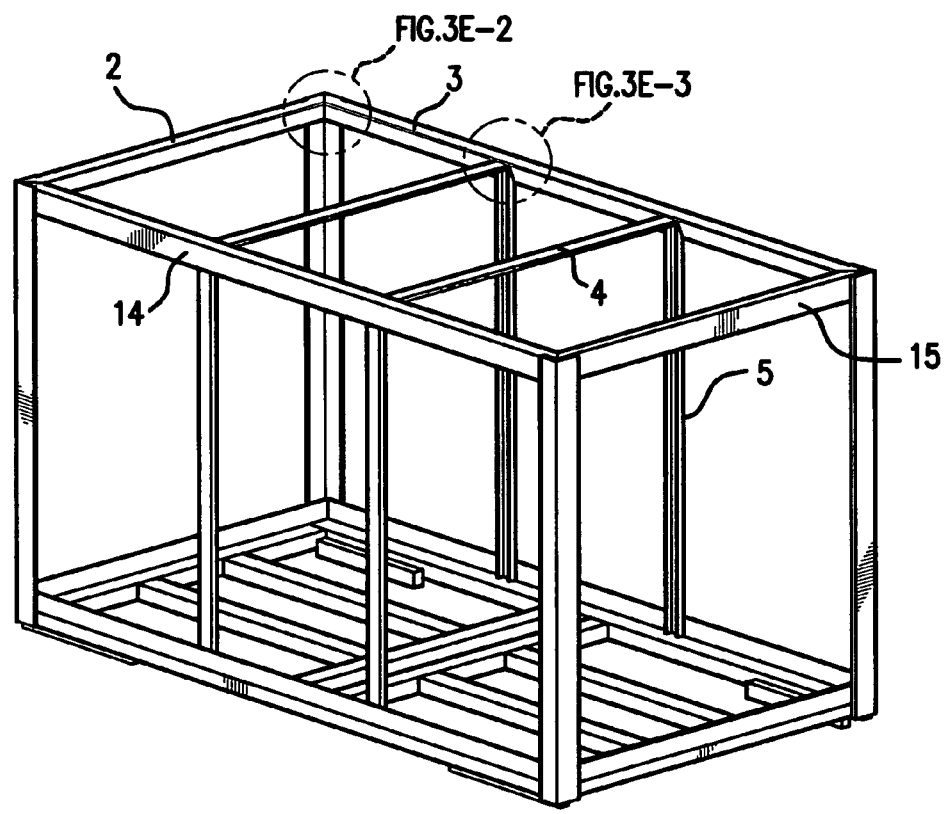

An illustrative embodiment of the positioning of inner feet 9 and outer feet 10 along the base of a container is shown in FIG. 3D (3D-1, 3D-2, and 3D-3). In one embodiment, inner feet 9 may be about 2 inches wide by 4 inches high (50.8 mm wide by 101.6 mm high), and outer feet 10 may be about 2 inches wide by 3 inches high (50.8 mm wide by 76.2 mm high). Outer feet 10 may be positioned in the channel of channel steel piece 7, to extend about ⅞ inch (22.225 mm) from the base, whereas inner feet 9 may be positioned on the outer surface of the channel of piece 7 (i.e., on the inner surface of the container) to extend from the base of the container by about 1 and ⅞ inches (47.625 mm). Feet 9 and 10 may be solid (or hollow) steel (or other metal) to provide support for the container. Thus, as shown in FIG. 3C and the views in 3D, the outer feet 10 may extend within the channel to the end of piece 7, whereas the inner feet 9 may abut against piece 6a. To allow the feet to extend the same length along the bottom surface, outer feet 10 may be longer than inner feet 9. In one example embodiment, inner feet 9 may be about 16 inches (406 mm) in length and outer feet 10 may be about 18 and ½ inches (470 mm) in length (FIG. 3C). Also, in one embodiment, both ends of each foot piece may be capped. Other specifications and/or dimensions may be employed for the inner and outer feet depending upon the type of wood being treated and the conditions of treatment.

Figure 5A:
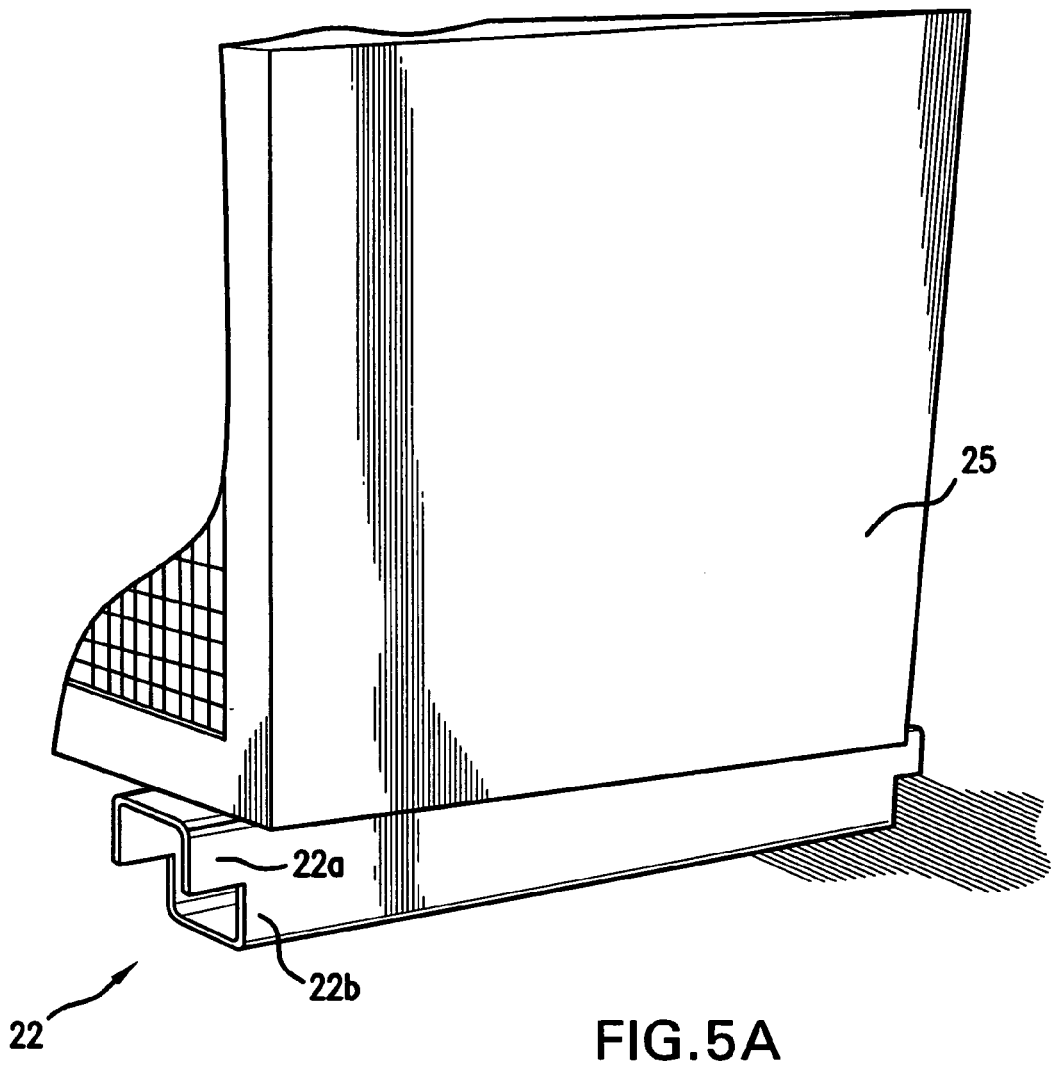
FIG. 5 shows a moisture exchange container in accordance with an alternate embodiment of the present invention where panel A shows a perspective view of an alternate foot for supporting the container, panel B shows a perspective side view of stacking of two containers, and panel C shows a frontal view of stacking of two containers.

FIG. 5, panels A, B, and C, shows an alternate embodiment of a moisture container of the present invention. As shown in FIG. 5A, the container may comprise two feet 22 that extends across the width of the container. In an embodiment, the foot may comprise portion 22a that extends beyond the base of the container perimeter, and a second portion 22b that extends almost to the perimeter of the container. In an embodiment, the length of the inner portion of the foot 22b will be a bit shorter than the internal perimeter of the container to facilitate stacking of the containers as described below. In an embodiment, the foot is a single piece of steel having a portion cut away to thereby form the overhanging portion. In an embodiment, a closed channel steel that is 6 inches by 6 inches (15.2 cm by 15.2 cm) is used to form the foot. The overhang, in an embodiment, may have dimensions of 4 inches by 3.25 inches (10.2 cm by 8.25 cm).

As further illustrated in FIG. 5A, the moisture exchange container of the present invention may comprise a side that is solid 25 (i.e., does not comprise apertures). In an embodiment, having one or two sides without apertures provides for additional structural support, while still allowing sufficient moisture exchange.

Figure 5B:
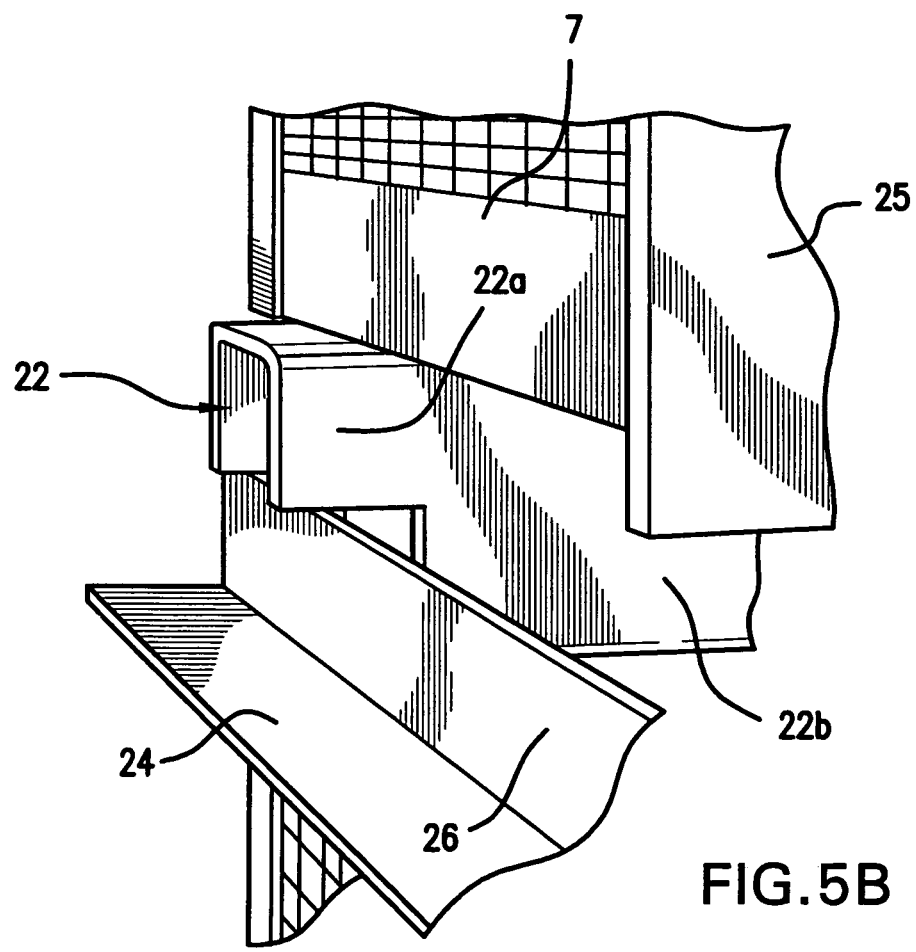
Figure 5C:
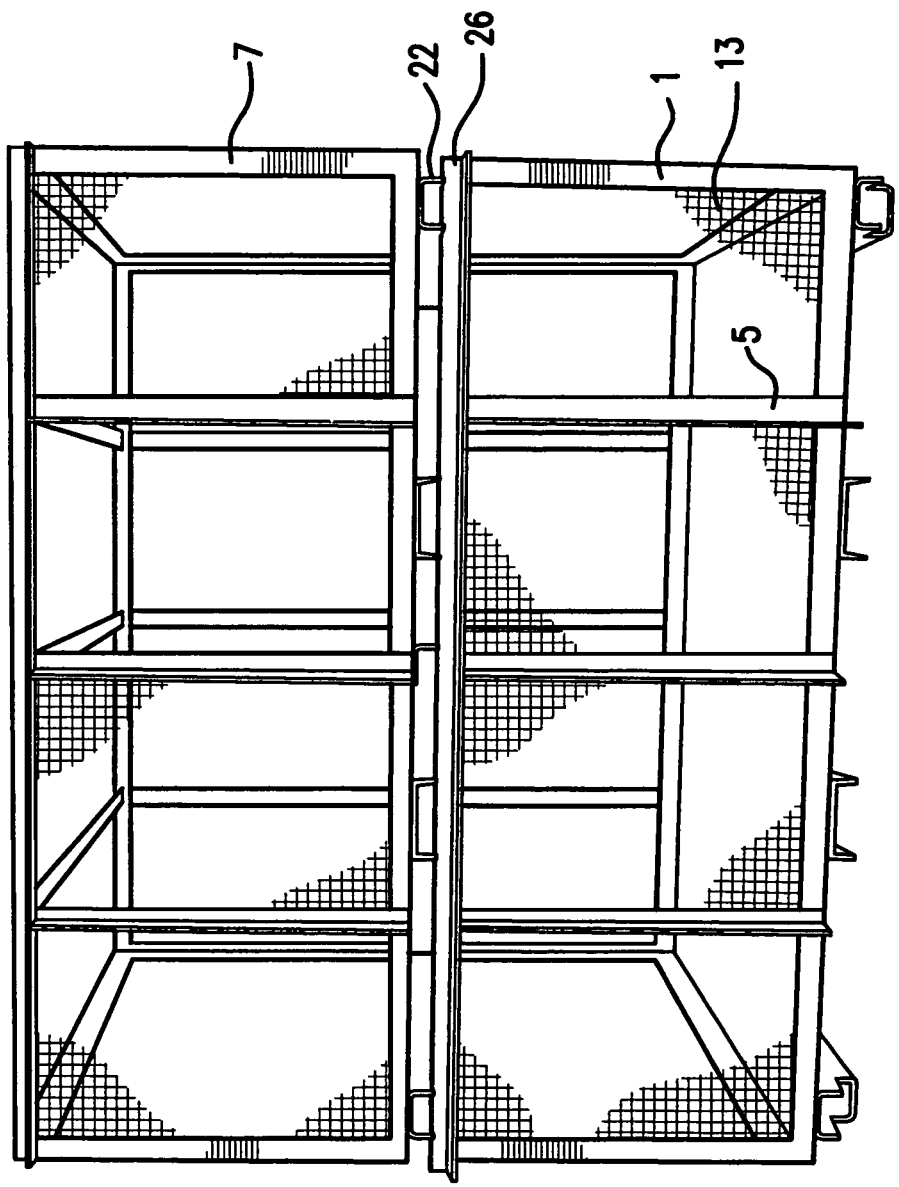

Using the feet of the embodiment shown in FIG. 5A may allow for stacking of the containers, while providing additional support for the containers. Thus, because the feet span the width of the container (FIG. 5A), the container may sit more securely on the feet with the weight of the container more evenly distributed over a larger area than in an embodiment where a smaller foot is used (e.g., foot 10 described above). An embodiment showing stacking of the containers of the present invention is shown in FIGS. 5B and 5C. It can be seen that for stacking of two containers, a portion of the foot 22b may extend into the container below. The overhang 22a may rest on the top frame piece 26 of the container below. The top frame may comprise a vertical piece 26 and a horizontal piece 24. In an embodiment, the vertical and horizontal pieces comprise a single L-shaped bar.

Compositions for the Treatment of Wood

Embodiments of the present invention also provide adhesive compositions for wood. Also, embodiments of the present invention also provide wood products made with the adhesives of the present invention. Embodiments of the compositions of the present invention may comprise embodiments of the methods, devices, and systems of the present invention as described herein. In an embodiment, the adhesive composition may be used with chemically treated wood. The adhesive composition of the present invention may, in certain embodiments, be formulated to provide increased adhesion. Such increased adhesion can be important for gluing pieces of wood together that are going to be subjected to physical stress. Such increased adhesion may also be important for wood that is chemically treated as the chemicals used to treat wood may react with chemical groups in the wood, such as the hydroxyl groups of cellulose, that can participate in binding an adhesive. Thus, a stronger adhesive may be required where the wood is to be chemically treated.

In at least some embodiments of the present invention, using the adhesive composition of the present invention may allow for wood pieces to be glued together prior to treatment with a preservative or other treatment formulation of interest. Alternatively, the wood pieces may be glued together using an embodiment of the adhesive of the present invention after treatment with a preservative or other treatment formulation.

In an embodiment, the adhesive of the present invention may comprise a polyvinylacetate (PVA) resin and a cross-linking agent. In one embodiment, the adhesive comprises an adhesive comprising a polyvinylacetate (PVA) resin and an isocyanate cross-linking agent. Alternatively, the adhesive of the present invention may consist essentially of a polyvinylacetate (PVA) resin and a cross-linking agent. The adhesive may, in certain embodiments, provide a predefined bond strength.

Thus, in alternate embodiments, the bond strength of the adhesive is greater than 1 Megapascal (MPa) (145 psi; 10.2 kg/cm$^2$), or 2 MPa (290 psi; 20.4 kg/cm$^2$), or 5 MPa (725 psi; 51 kg/cm$^2$), or 7.5 MPa (1088 psi; 76.5 kg/cm$^2$), or 10 MPa (1450 psi; 102 kg/cm$^2$), or 15 MPa (2175 psi; 153 kg/cm$^2$). For example, the bond strength of the adhesive may range from 1 MPa (145 psi; 10.2 kg/cm$^2$) to 20 MPa (2,900 psi; 204 kg/cm$^2$), or from 2 MPa (290 psi; 20.4 kg/cm$^2$) to 18 MPa (2,610 psi; 183.5 kg/cm$^2$), or from 5 MPa (725 psi) to 17 MPa (2465 psi; 173 kg/cm$^2$), or from 7.5 MPa (108 psi; 76.5 kg/cm$^2$) to 15 MPa (2175 psi; 153 kg/cm$^2$). For example, in alternate embodiments, the adhesive bond strength provides greater than 80%, or greater than 85%, or greater than 90%, or greater than 92%, or greater than 95%, or greater than 97% wood failure when the adhesive is used to bond two pieces of wood. In one embodiment, the measurement of bond strength comprises use of the ASTM tension and/or flexure tests as described herein.

In an embodiment, the isocyanate cross-linking agent may comprise a diphenylmethane diisocyante (MDI). The MDI may comprise a mixture of polymeric MDI (pMDI) and pure MDI. The pure MDI may comprise 2,4' diphenylmethane diisocyanate and 4,4'-diphenylmethane diisocyanate. The polymeric MDI may comprise a mixture of polymers as is known in the art. In an embodiment, the polymeric MDI may comprise a pure MDI as well as a tri-isocyanate, a tetra-isocyanate, a penta-isocyanate, and a small percentage of higher homologues. The average functionality of a polymeric MDI typically may range from about 2.5 to about 3.0. In an embodiment, the isocyanate cross-linking agent may comprise a methylene diphenyl diisocyanate (CAS 101-68-8). Additionally or alternatively, the isocyanate cross-linking agent may comprise a poly(methylene phenylene isocyanate) (CAS No.: 9016-87-9). The cross-linking agent may further comprise a methylene diphenylylisocyanate (CAS No.: 26447-40-5). In an embodiment, the poly(methylene phenylene isocyanate) comprises about 45-55 wt. %. Also, the methylene diphenyldisocyanate may comprise about 40-50 wt %. Additionally, the methylene diphenylylisocyanate may comprise about 1-10%. In one embodiment, the cross-linking agent may comprise Isoset® CX-47, distributed by Ashland Specialty Chemicals Company (Ashland, Ohio). Or, in certain embodiments, other polymeric MDIs such as SUPRASEC® 5025 (Huntsman) may be used.

The polyvinyl acetate (PVA) resin may comprise a polyvinyl acetate polymer. Also, there may be other components in the PVA resin. For example, the PVA may comprise a polyvinyl alcohol. Also, the PVA resin may comprise a solvent such as an aromatic diester or phenol. In an embodiment, the PVA resin may comprise about 10 to 80% polyvinyl acetate, and about 5-15% polyvinyl alcohol. Additional components may include about 15-70% water, and about 1-5% of any other solvents. The PVA resin may also comprise a coalescent, such as ethylene glycol. Also, a stabilizer or filler, and a defoamer may be included. In certain embodiments, the PVA resin may comprise PVA 2723 or PVA 2720 (Specialty Polymers, Inc., Woodburn, Oreg.). PVA 2723 and PVA 2720 differ in that PVA 2720 does not include a coalescent.

The adhesive may be used for wood that has been treated with a chemical formulation or untreated wood. In one embodiment, the adhesive may be used with wood treated at elevated temperature and pressure with a formulation comprising organic components such as a fungicide and a pesticide, ionic components, such as a surfactant and an emulsifier, an oil or a wax (e.g., a water repellant). When used with a treated wood, the adhesive of the present invention may comprise a bond strength that can withstand a force of greater than 2,000-3000 psi (141-211 kg/cm$^2$) when wood glued using the adhesive is subjected to the ASTM vacuum-pressure tension test. Or, the adhesive of the present invention may comprise a bond strength that can withstand a force of greater than 4,000-5,000 psi (281-345 kg/cm$^2$) when wood glued using the adhesive is subjected to the ASTM dry tension test. Or, the adhesive of the present invention may comprise a bond strength that can withstand a force of greater than 2,500-4,000 psi (176-281 kg/cm$^2$) when wood glued using the adhesive is subjected to the ASTM elevated temperature tension test. Or, the adhesive of the present invention may comprise a bond strength that can withstand a force of greater than 2,100-3,000 psi (148-211 kg/cm$^2$) when wood glued using the adhesive is subjected to the ASTM boil tension test. Or, the adhesive of the present invention may comprise a bond strength that can withstand a force of greater than about 800 psi (56 kg/cm$^2$) when wood glued using the adhesive is subjected to the ASTM flexure test. Or, the adhesive of the present invention may comprise a bond strength that can withstand a force of greater than about 800 psi (56 kg/cm$^2$) when wood glued using the adhesive is subjected to a green-strength flexure test as described herein. Bond strengths are generally greater for untreated wood.

The cross-linking agent may comprise a number of cross-linking agents that are known to work with adhesives. In one embodiment, the cross-linking agent is a polymeric diphenylmethane diisocyanate specifically formulated to work with ethylene vinyl acetate (EVA). The present invention, however, utilizes a polymeric diphenylmethane diisocyanate formulated to work with ethylene vinyl acetate (EVA) with a polyvinyl acetate (PVA) resin. Thus, embodiments of the present invention may provide a "hybrid" adhesive formulation that comprises a PVA resin mixed with an ethylene vinyl acetate (EVA) specific cross-linking agent. For example, in an embodiment, use of the combination of ISOSET® CX-47 with a PVA resin may, in certain embodiments, provide substantially superior properties to an adhesive that is made using an EVA resin and ISOSET® CX-47.

In alternate embodiments, the ratio of equivalents of the reactive hydroxyl groups provided by water in the polyvinyl acetate resin to the cyanate groups (NCO) in the isocyanate cross-linking agent ranges from about 20 to 140, or from about 30 to 120, or from about 45 to 100. The equivalent ratio may be determined by calculating the number of NCO equivalents per mole of the isocyanate and the number of hydroxyl equivalents (including water) per mole of PVA. For example, to determine the equivalents of a methylene diphenyl isocyanate (MDI) cross-linker, the mass of the MDI is multiplied by the percent NCO content to obtain the mass of the NCO, which is then divided by the NCO equivalent weight (42) to determine the NCO equivalent number. Similarly, to determine the equivalents of water in the PVA, the total amount of water per mole of PVA is divided by 18/2, since one molecule of water (mass=18) reacts with 2 moles of NCO.

The cross-linking agent used for embodiments of the adhesive of the present invention may comprise a range of concentrations. In alternate embodiments, the isocyanate cross-linking agent may be mixed with the PVA resin to provide a final concentration of cross-linker ranging from about 10% to about 30% by weight (wt. %), or from about 12 wt. % to about 25 wt. %, or from about 15 wt. % to about 20 wt. %. In one example embodiment, the ISOSET® CX-47 cross-linking agent is about 16-17 wt. % and the PVA is about 83%-84 wt. %.

In an embodiment, the adhesive composition of the present invention is used to glue wood that does not need to be treated with any type of chemical formulation. Or, the adhesive of the present invention may be used to glue wood that has been, or is going to be, subjected to a high temperature/high pressure impregnation with a chemical formulation of interest. For example, the adhesive of the present invention may be used to glue wood prior to a high temperature/high pressure impregnation with an organic formulation, or an oil, or a wax-based preservative. In one embodiment, the hybrid adhesive is used to glue wood that is to be treated with the treatment formulation used to make commercially treated wood products.

Certain embodiments of the adhesive compositions of the present invention may comprise characteristics that are important for preparing treated wood. For example, embodiments of the adhesive of the present invention may result in increased adhesion of wood that has been chemically treated or that is going to be chemically treated. In other embodiments, the adhesive may result in increased stability to the conditions, such as high temperature and/or pressure, that are used for chemically treating wood. The improved stability of the adhesive may be demonstrated by ASTM D 5572 testing on the glue joints. In alternate embodiments, when measured by the ASTM D 5572 tension or flexure test, the adhesive of the present invention may comprise a wood failure of greater than 80%, or greater than 85%, or greater than 88%, or greater than 90%, or greater than 92%, or greater than 95%, or greater than 97%. Also, and more importantly for use of the adhesive in production, in flexure tests of green strength of the adhesive (i.e., before the adhesive has been heat cured), the present invention may comprise a wood failure of greater than 80%, or greater than 85%, or greater than 88%, or greater than 90%, or greater than 92%, or greater than 95%, or greater than 97%. Thus, the adhesive of the present invention may not require heat-treatment or prolonged incubation periods for curing.

Wood that has been impregnated with a chemical preservative or other formulation may weigh up to three times its original (i.e., pre-treatment) weight. The additional weight may cause a significant strain on any glued joints. When using conventional glues, breakage of about 10% to 20% of the glued joints may occur for chemically treated wood products. In alternate embodiments, using the hybrid adhesives of the present invention, breakage of fingerjointed boards that are removed from the treatment vessel may be reduced to less than 10%, or less than 5%, or less than 3%, or less than 1%, or less than 0.5% breakage due to the increased cross-linking of the adhesive.

Embodiments of the adhesive of the present invention may also comprise an increased rate of setting. Once the PVA resin and the isocyanate cross-linker are mixed, an exothermic reaction may occur, emitting carbon dioxide and promoting cross-linking within the adhesive and between the adhesive and the wood. Also, because the isocyanate cross-linker becomes part of the glue, in certain embodiments, a stronger bond may be formed than is formed with PVA or EVA adhesives that rely only on a catalyst such as aluminum chloride for formation of chemical bonds. Conventional adhesives may require about 24 hours to 30 days or more to set before the glued wood can be subjected to chemical treatment under conditions of high temperature. In contrast, when an embodiment of the adhesive of the present invention is used, wood may be chemically treated under conditions of high temperature and pressure at 14 hours or less after gluing. The faster setting time of the adhesive may result in a shorter "pot life" for the glue prior to use, where pot-life is the time that the adhesive can be stored prior to use. For example, the pot-life for the hybrid adhesive of the present invention may be less than 4 hours, or even less that 1 hour, as compared to 48 hours or more for conventional adhesives. In one embodiment of the present invention, the pot-life may be about 0.5 hour.

By using an isocyanate-based cross-linker, embodiments of the adhesive of the present invention may be used to bond pieces of wood without any type of heating step. For applications that require fast setting of the glue, conventional PVA glues may require a heating step to promote cross-linking of the PVA adhesive. For example, a PVA-aluminum chloride (5%) adhesive may be heated to accelerate the time period for the adhesive to cure from 30 days for 100% adhesion (or 24 hours for 80% adhesion) to 16 hours for 100% adhesion. By using an embodiment of the adhesive of the present invention, the need to heat the adhesive to induce cross-linking may be substantially eliminated, such that there is no need to include a heating step for the adhesive to bond two pieces of wood together.

Also, embodiments of the adhesive of the present invention may exhibit less chalking than aluminum chloride-based adhesives. In one embodiment, the hybrid adhesive comprises a lower temperature at which chalking occurs. Thus, the adhesive may comprise substantially less chalking at temperatures between 35° F. to 60° F. than standard aluminum chloride adhesives. In one embodiment, chalking of the adhesive allows for use of the adhesive at all temperatures above freezing, such that the level of chalking for the adhesives of the present invention is such chalking does not affect the performance of the adhesive when used at any temperature above freezing, whether the wood is treated or untreated. In an embodiment, chalking of the adhesive of the present invention at temperatures above the freezing point of water is so low as to be undetectable. In an embodiment, the reduced level of chalking allows for the use of a PVA resin, such as PVA 2720, that does not include a coalescent.

There may be some applications, however, in which the adhesive may further comprise a metal as a catalyst. The aluminum chloride may comprise $AlCl_3$. In an embodiment, the catalyst may comprise analogous catalysts used in the art.

The metal catalyst may act to facilitate heat transfer within the adhesive, thereby promoting cross-linking of the isocyanate and the hydroxyl groups in the PVA resin and wood. In alternate embodiments, a metal catalyst (e.g., aluminum chloride) may be present at levels ranging from 0.25% to 10%, or 1% to 7.5%, or 3% to 5%.

Embodiments of the adhesive of the present invention may also comprise increased water resistance as compared to other adhesives used for gluing treated or untreated wood. The increase in water resistance for the adhesive of the present invention may be exemplified by the results of the ASTM D 5572 tension tests under the Vacuum-Pressure and/or Boil conditions where the glue is exposed conditions of high moisture and either high temperature or changes in pressure. As shown in the examples below, the hybrid adhesive of the present invention exhibits a higher percentage Wood Failure (i.e., a lower adhesive failure) in the Vacuum-Pressure and Boil tests than the other types of glues. Thus, the hybrid adhesive of the present invention may exhibit substantially more resistance to water as compared to aluminum chloride adhesives typically used for gluing treated or untreated wood.

Systems for Treating Wood

Embodiments of the present invention may also comprise systems for treating wood. Also, embodiments of the present invention comprise wood made using the systems of the present invention. Embodiments of the systems of the present invention may comprise embodiments of the methods, devices, and compositions of the present invention as described herein.

In one embodiment, the systems of the present invention may be used for treating wood with a chemical formulation under conditions of high temperature and pressure. For example, in one embodiment, the system may comprise: (a) a station for loading a container for treating a plurality of wood pieces with a liquid, the container comprising a supportive framework for holding a plurality of wood pieces in the container and at least one surface comprising a plurality of apertures, wherein the apertures comprise a size such that a fluid can pass through the apertures, but the plurality of wood pieces within the interior of the container do not pass through the apertures; (b) a station for treating the wood pieces with a liquid formulation of interest; (c) a station for removing excess moisture from the wood after the wood has been treated with the liquid; and (d) a station for gluing at least a portion of the wood pieces together.

Figure 6:
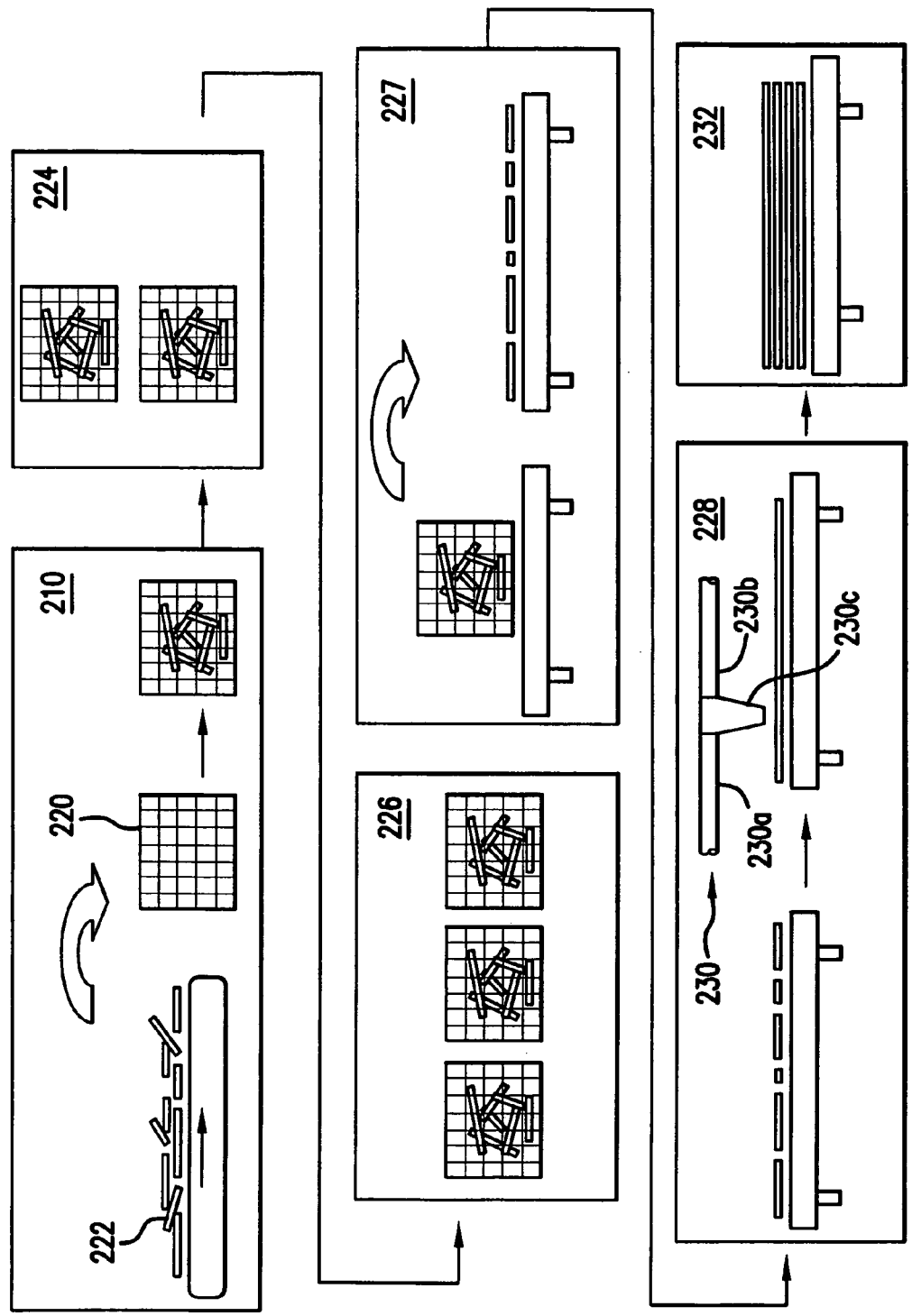
FIG. 6 shows a diagrammatic representation of a system used for treating wood in accordance with an embodiment of the present invention.

Example embodiments of systems of the present invention are shown in FIGS. 6 and 6. Referring now to FIG. 6, the system may comprise a station 210 to load a moisture exchange container (MEC) 220 with wood 222. The wood 222 may be natural wood as well as wood-based composites. Also, the wood may comprise a variety of different types of lumber such as industrial grade lumber, plywood, random length boards, clear cutstock lumber, fingerjoint cutstock lumber, ripped lumber, or types of wood suitable for production of building structures. For at least certain embodiments of the system, the type of wood is not limited to any particular species of wood. The wood may be a hard wood, such as cherry, ash, mahogany, troko, beech, oak, maple, birch, walnut, teak, alder, aspen, beech, cottonwood, elm, gum, poplar or willow. Or, a soft wood such as larch, pine, fir, Douglas fir, hemlock, redwood, and spruce and may be used.

In an embodiment, the system may further comprise a treatment vessel 224 into which the moisture exchange containers 220 that have been loaded with wood 222 may be placed for treatment with a chemical formulation of interest. The treatment vessel may comprise, for example, a closed container that is able maintain either a positive pressure or a vacuum during various stages of treating the wood. Also, the treatment vessel may be able to maintain an elevated temperature during treatment of the wood. In one embodiment, the treatment vessel 224 may comprise an autoclave.

For example, the treatment may comprise adding a water-based formulation to the pores of the wood. Or, the treatment may comprise adding an organic formulation to the pores of the wood. In one embodiment, the treatment formulation may comprise a preservative. Or, the treatment formulation may provide increased water resistance to the wood. Or, a fire retardant may be added. In yet another embodiment, the treatment formulation may comprise a pesticide. Or, the treatment formulation may comprise a water-based wax emulsion as a means to increase the water resistance of the wood. As used herein, water resistance is the ability of wood to withstand very dry and/or wet conditions without losing or gaining substantial amounts of water, respectively.

Thus, the treatment formulation may comprise at least one of water, a wax, a surfactant (i.e., nonionic, anionic, amphoteric), an oil, a fungicide, an insecticide, a preservative, a pesticide, a fire retardant, or water repellant as is commonly used in chemical formulations for treating wood. In one embodiment, a commercial treatment formulation for making wood products is used. The formulation may be applied in a manner as to substantially fill the treatment vessel.

In one embodiment, the treatment station 224 may subject the wood to a vacuum followed by a period under positive pressure to facilitate penetration of the wood with the treatment solution as described herein. The positive pressure may range, for example, from about 5 to 200 pounds per square inch (psi) (0.35 to 14 kg/cm$^2$). After a period sufficient for substantial penetration of the wood by the treatment formulation, the positive pressure in the vessel may be released, and any excess (i.e., nonadsorbed) treatment solution may be removed from the vessel. The pressure in the vessel may then be further reduced below atmospheric pressure. Pulling a vacuum in the treatment vessel may help to remove at least some of the moisture remaining in the wood after treatment with the preservative formulation.

In certain embodiments, the system may allow the temperature to be varied to promote penetration of the wood with the formulation of interest. For example, in an embodiment, for a formulation that contains wax or an oil, a higher temperature may facilitate penetration of the wood cells with the wax or oil. Also, the temperature may vary depending upon the elevation of the treatment facility. Thus, during the treatment cycle, the treatment station may range, in certain embodiments, from about ambient temperature to about 200° F. (93.3° C.). In one embodiment, a temperature of about 150° F. to 160° F. (65.6° C. to 71.1° C.) is used for treatment of the wood.

After the wood has been treated, and if required, the pressure released, the treatment vessel may, in certain embodiments, be drained of the treatment formulation. At this point, if the formulation used was water-based, the wood may have an excess of the water in the cells of the wood and/or coating the surface of the wood. Thus, the treatment station may comprise a device to apply a vacuum to the wood to remove at least part of the water from the wood. In one embodiment, a vacuum ranging from about −13 inches to about −20 inches (−406 mm to −508 mm) of mercury may be applied for about 0.5 hour.

In some embodiments, even with application of a vacuum to remove excess moisture, there may be a need to remove additional moisture from the treated wood. Thus, the system may, in certain embodiments, also comprise a station for drying the wood after the wood has been treated 226. In one embodiment, the drying station may comprise a kiln or other type of oven. The wood may be left in the moisture exchange container during the drying step. In another embodiment, the wood may be directly loaded into the kiln, and spacers may be used to separate the wood pieces to facilitate drying. The drying schedule may depend, in part, on the nature of the treatment solution used, the type of wood being treated, the external humidity, and the desired final moisture content to be achieved for the wood being treated. In one example embodiment, the kiln may be ramped up to about 100° F. to 155° F. (37.8° C. to 68.3° C.) and then the temperature in the kiln may be set to operate, with multiple set points, in the range of about 100° F. to 180° F. (37.8° C. to 82.2° C.), such that after about 50 to about 180 hours, the wood may be dried to a final moisture content of about 5% to about 20%. For high temperature drying, the kiln may be heated to 280° F. (138° C.). In one embodiment, the wood remains in the kiln at a temperature of about 140° F. to 160° F. (60° C. to 71.1° C.) for about 136 hours to provide a final moisture content in the range of about 5% to about 15%.

The size of the drying station may be varied depending upon the processing schedule. For example, in one embodiment, for mass production of a single wood species or a plurality of wood species, the kiln may be sized to dry approximately 21,000 cubic feet of wood.

Embodiments of the system may also include a station 227 for unloading the moisture exchange container. In an embodiment, the unloaded wood is ready to be stored and/or shipped. Alternatively, the wood may require further processing.

For example, the wood may be further assembled into large pieces as required. Thus, embodiments of the system may further include an assembly station 228. The assembly station may comprise a station at which assembly of wood products may occur. The assembly station may be positioned after the treatment station, or in alternate embodiments, before the treatment station. In an embodiment, the assembly station may comprise a station for gluing smaller wood pieces together to make larger products.

In an embodiment, the station for gluing wood pieces together, may comprise an apparatus 230 for mixing a two-part adhesive formulation. For example, where the hybrid adhesive formulation of the present invention is used, there may be a first closed tube 230a comprising the cross-linker (e.g., diphenylmethane diisocyanate) and a second closed tube 230b comprising the PVA resin. In one embodiment, both parts of the adhesive (cross-linker and PVA resin) are pumped through the tubes 230a, and mixed together in chamber 230c under substantially air-tight (i.e., anaerobic conditions) immediately before application to the wood. In an embodiment, the two-part dispenser provides for controlled mixing of the two components (e.g., PVA and MDI) required for the adhesive. Also, in an embodiment, the closed nature of the dispenser 230 (230a, 230b, and 230c) provides for reduced foaming as the MDI and MDI-reactive groups present in the PVA adhesive react.

Once the larger wood product has been cut and trimmed to precisely the size needed, the wood may be transferred to a storage station 232 and stacked for storage and/or delivery.

Figure 7:
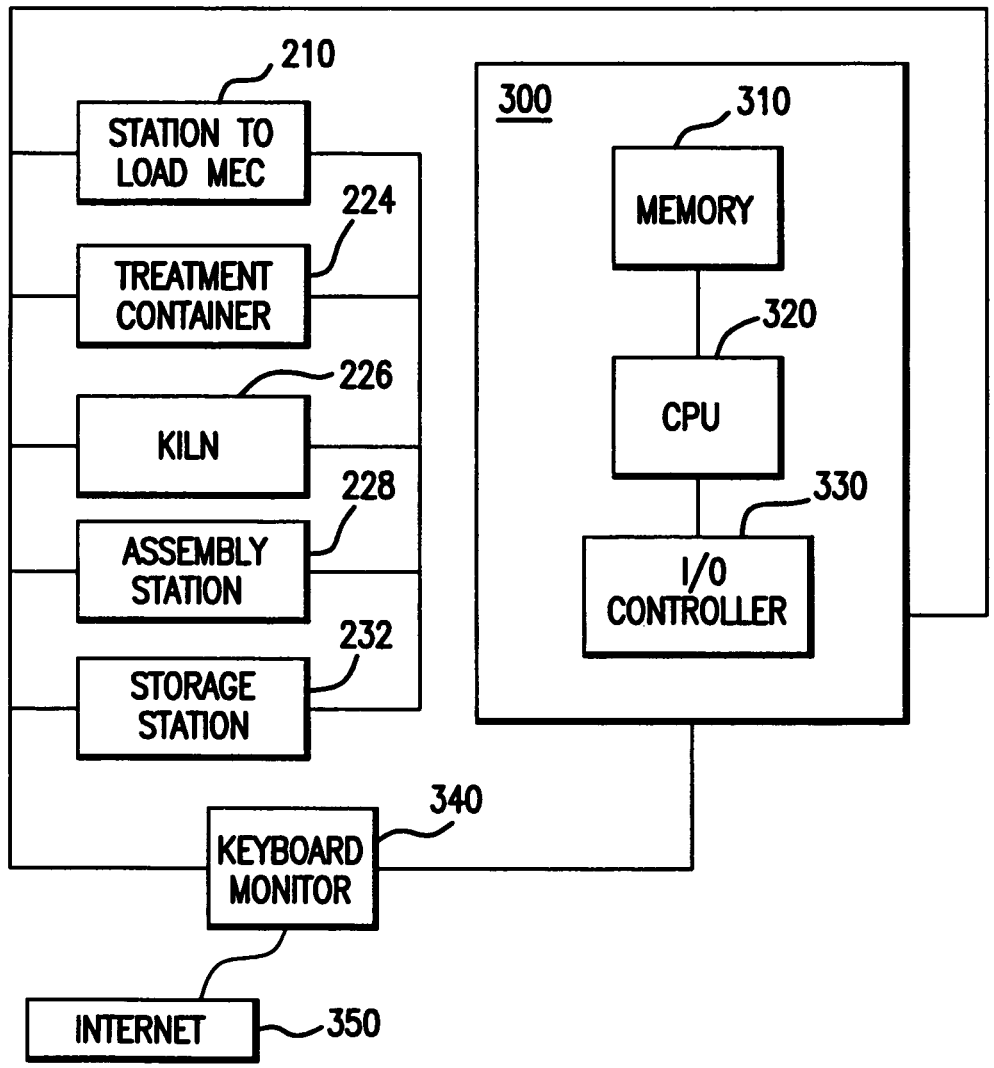
FIG. 7 shows a diagrammatic representation of a system used for treating wood in accordance with an alternate embodiment of the present invention.

In certain embodiments, the system may be automated. As schematically illustrated in FIG. 7, at least some of the stations may be controlled by a computer 300. In alternate embodiments, the user may input instructions via a keyboard 340, floppy disk, remote access (e.g., via the internet) 350, or other access means at various points in the production line. The user may enter instructions including options for the run, how reports should be printed out, and the like. The computer may comprise software encoded on a computer-readable medium for programming the system. For example, software specifically developed for manufacturing, process control, operator-machine interfacing, and data acquisition may be used. In an embodiment, the software mey comprise CITEC, WONDERWARE®, TESTPOINT®, or other manufacturing software as known in the art. Also, at each step in the production schedule, the data may be stored in the computer using a storage device common in the art such as disks, drives or memory 310. As is understood in the art, a processor 320 and I/O controller 330 are generally required for multiple aspects of computer function.

EXAMPLES

Example 1

Moisture Exchange Container

A moisture exchange container of the present invention may comprise dimensions as required. An example embodiment of dimensions that may be used for a moisture exchange container suitable for treating about up to about 5,000 pounds (2,268 kg) of fingerjoint cutstock may comprise the individual parts as described herein, with external dimensions of about 90 and ¾ inches in length, 55 and ¾ inches high, and 48 inches wide (2.3 m in length, 1.42 m high, and 1.22 m wide). For a larger kiln and/or treatment vessel, a moisture exchange container that is 128 inches (2.305 m) in length, 55 and ¾ inches (1.42 m) high, and 48 inches (1.22 m) wide may be used. Thus, in one example embodiment, the base pieces and top pieces used to make the framework of the container are either 90 inches (2.29 m) long (i.e., pieces 3, 7, 11, and 14) or 48 inches (1.22 m) long (i.e., pieces 2, 4, 12, and 15) (FIG. 3A). Because they are placed internal to long supports 7, support pieces 6a and 6b are 42 inches in length. Also, in one example embodiment, the pieces used for vertical supports 1 and 5 may be 55 inches (1.4 m), and 52 and ¾ inches (1.34 m) in length, respectively. Using a framework comprising the dimensions described above, the container may be about 90 and ¾ inches (2.3 m) in length, 55 and ¾ inches (1.41 m) in height, and 48 and ¾ inches (1.24 m) in width. In addition, as discussed above, the container may comprise inner feet 9 that extend about 1 and ⅞ inches (47.625 mm) from the container bottom surface and outer feet 10 that extend about ⅞ of an inch (22.23) from the container bottom surface.

In an alternate embodiment, the moisture exchange container may comprise feet that are each made from a single piece of square (i.e., closed) channel steel that is 6 inches by 6 inches (15.2 cm by 15.2 cm). The foot may have a portion cut from each end that extends beyond the base of the container perimeter. For example, in one embodiment, a portion 4 inches by 3.25 inches (10.2 cm by 8.25 cm) is cut from a piece of 6 inch by 6 inch (15.2 cm by 15.2 cm) square channel steel. In an embodiment, the length of the foot is 52 inches (1.32 m) so that the foot extends about 2 inches (50 mm) beyond the perimeter of the container. The portion of the foot that is internal to the overhang is cut to be slightly shorter than the internal perimeter of the container. In this way, the base of the foot can be inserted into top frame of a second container to facilitate stacking of the containers. Using feet that extend the width of the container (e.g., FIG. 5) may allow for stacking of the containers, while providing additional support for the containers. For stacking of two containers, the internal portion of the foot may extend into the container below with the overhang able to rest on the top frame piece of the container below. The top frame may comprise a vertical piece and a horizontal piece. In an embodiment, the vertical and horizontal pieces comprise a single L-shaped bar.

Also, the moisture exchange container of the present invention may comprise a side that is solid (i.e., does not comprise apertures). In an embodiment, having one or two sides without apertures provides for additional structural support, while still allowing sufficient moisture exchange. Also, a third and in some cases, a fourth solid side may be added.

Example 2

Hybrid Adhesive

Experiments were performed to test various adhesive formulations. In the experiments described below, the adhesive formulation of the present invention is denoted as "hybrid." The hybrid adhesive was a mixture of an isocyanate containing cross-linking agent (ISOSET® CX-47) and a polyvinyl acetate resin (PVA SP 2723) mixed as described below.

To measure the efficacy of the various glue types, samples were glued, and then (optionally) exposed to high pressure/high temperature treatment with a chemical formulation followed by testing of the glue. The adhesive strength was tested using either an in-house flexure test (Table 1) or the ASTM D 5572 tension test (ASTM D 5572: Standard Specification for Adhesives Used for Finger Joints in Nonstructural Lumber Products, Reapproved 1999) (Tables 2, 3 and 4). In the flexure test procedure, pressure is directly applied across a glued fingerjoint. In the tension test procedure, two pieces of wood that are fingerjointed in a central portion are pulled apart from each end.

In both the in-house flexure test and the ASTM D 5572 tension test, the strength of the adhesive is measured in terms of the amount of wood in the break (i.e., percentage wood failure; % WF). Since the glue can only perform as well as the wood, a large amount of wood in the break comprises a high percentage of wood failure and thus, a lower percentage adhesive failure. Also, the force required to break the wood was determined. The force required to break the wood can also be indicative of the strength of the adhesive bond. As shown in the tables below, however, the absolute force (i.e., load) may vary depending on the treatment of the wood before or after gluing. Thus, the relative force (i.e., within a particular test group) and the percentage wood failure may provide a better approximation of the working strength of the glue than the absolute load required to break the wood.

The general procedures used, and the designation of treatments as shown in the tables are as follows:

(1) Fingerjoint samples;
(2) Glue;
(3) Optionally, heat-cure the glue by heating in a kiln (Post-Cure);
(4) Optionally, treat glued samples at high-temperature and high-pressure with a chemical agent that includes organic compounds, an emulsifier, and a water repellant by exposing the samples to an initial vacuum of −21 inches (−533 mm) of mercury for 5 minutes, followed by addition of the treatment formulation, and treatment at 150-160° F. (65.6° C.-71.1° C.), high pressure (e.g., 150 psi; 10.5 kg/cm$^2$), for 60 minutes (Treat, Treat/Wet, or Treat/Dry);
(5) For samples treated with the treatment formulation at high temperature and high pressure, optionally dry in kiln (Treat/Dry);

(6) For ASTM D-5572 tension testing, expose samples to one of the four conditions used for the ASTM D 5572 test (Dry; Vacuum-Pressure; Elevated Pressure; and Boil Exposure); and
(7) Test by the in-house flexure test or the ASTM D-5572 tension method.

Initial screening of adhesive formulation utilized an in-house flexure test. In contrast to the ASTM flexure test, the in-house flexure test is designed to measure the adhesive strength under conditions simulating those used in production and thus, does not expose the glued samples to the post-cure experimental conditions used for the ASTM D 5572 test (i.e., Dry; Vacuum-Pressure; Elevated Pressure; and Boil Exposure as described below) prior to testing of the joint. Thus, the in-house flexure test provide a more accurate representation of the green (i.e., pre-cure) strength of the glue.

In the in-house flexure test, a 4 inch (10.1 cm) ram having a 12 inch (30.5 cm) base was used. The wood was treated as required (see above), glued, and placed in the flexure apparatus. The wood being tested may comprise fingerjoint or laminated joint as the glue line. For the tests described herein, fingerjoint wood was used. The flexure apparatus is designed to hold the ends of the wood sample fixed while applying a measured force (i.e., load) directly across the glue joint.

For flexure testing, boards ranged in size from 1 and 7/8 inch (47.625 mm) in width to 3 and 5/8 inches (92.3 mm) in width. The boards were all at least 12 inches long so as to span the base of the flexure apparatus, and 1 and 9/16 inches (39.7 mm) thick. The board is set on edge in the flexure machine (so that the width of the board is parallel to the ram) and the fingerjoint is positioned to span the thickness and perpendicular to the ram; in this way boards of the same thickness are rammed using the flexure machine. Measurements for boards having various widths were corrected to provide a value that is relative to a board that is 3/4 inches by 3/4 inches (19.0 mm by 19.0 mm) (the size of the board used in the ASTM D-5572 flexure test).

Table 1 shows results for screening of various glue types as performed using the in-house flexure test. Results comparing several EVA resins (Ashland A312, A320, and A322) mixed with varying percentages of an isocyanate cross-linker (ISOSET® CX-47) as shown, were compared to the hybrid adhesive of the present invention (PVA SP 2723/CX-47) at various concentrations of the crosslinker. Also shown are the results for a PUR glue (Ashland EW-500) and a PVA glue (SP2723/C200-y) with C200-y as a catalyst.

For the samples shown in Table 1, Treat/Dry corresponds to samples that were tested after pressure-treating with the treatment formulation, and then dried in the kiln. Treat/Wet corresponds to samples that were tested after pressure treating with treatment formulation, but while the wood was still wet (i.e., the samples were not dried in the kiln). In addition, some of the glued samples were subjected to a heat cure at 120° F. (49° C.) for 16 hours (Post-Cure), whereas other samples were not heat cured (Ambient) prior to treatment and/or testing by the flexure test. The pressure used for treatment of the wood with a treatment formulation is indicated ("Pressure").

TABLE 1

Initial Screening by Flexure Testing

| | | | | 1A: SP 2723/CX-47 Hybrid | | | | |
|---|---|---|---|---|---|---|---|---|
| Resin | SP 2723 | SP 2723 | SP 2723 | SP 2723 | SP 2723 | SP 2723 | SP 2723 | SP 2723 |
| Cross-link | CX-47 | CX-47 | CX-47 | CX-47 | CX-47 | CX-47 | CX-47 | CX-47 |
| % CX-47 | 15% | 15% | 15% | 15% | 20% | 20% | 20% | 20% |

TABLE 1-continued

Initial Screening by Flexure Testing

| Pressure | 21 bar | 21 bar | 21 bar | 21 bar | 21 bar | 21 bar | 21 bar | 21 bar |
|---|---|---|---|---|---|---|---|---|
| Treat/Dry | + | | + | | + | | + | |
| Treat/Wet | | | | | | | | |
| Post-Cure | | | + | | | | + | |
| Ambient | + | + | | + | + | + | | + |
| Load (PSI) | 888 | 966 | 858 | 955 | 855 | 852 | 835 | 939 |
| Load (kg/cm$^2$) | 62.4 | 67.9 | 60.3 | 67.2 | 60.1 | 59.9 | 58.7 | 66.0 |
| % WF | 85 | 97 | 92 | 89 | 93 | 94 | 97 | 94 |

1B: Other Glues

| Resin | A312 | A312 | A312 | A312 | A312 | A312 | A312 | A312 | A312 |
|---|---|---|---|---|---|---|---|---|---|
| Cross-link | CX-47 | CX-47 | CX-47 | CX-47 | CX-47 | CX-47 | CX-47 | CX-47 | CX-47 |
| % CX-47 | 15% | 15% | 15% | 15% | 15% | 15% | 15% | 15% | 15% |
| Pressure | N/d | N/d | Nd | 15 bar | 15 bar | 20 bar | 20 bar | 35 bar | 35 bar |
| Treat/Dry | + | + | + | + | | + | | + | |
| Treat/Wet | | | | | | | | | |
| Post-Cure | | + | | | | | | | |
| Ambient | + | | + | + | + | + | + | + | + |
| Load (PSI) | 636 | 808 | 844 | 1117 | 1354 | 995 | 939 | 1102 | 1218 |
| Load (kg/cm$^2$) | 44.7 | 56.8 | 59.3 | 78.6 | 95.2 | 70.0 | 66.0 | 77.5 | 85.7 |
| % WF | 88 | 77 | 89 | 78 | 96 | 65 | 76 | 80 | 87 |

1C: Other Glues (cont)

| Resin | A320 | A320 | A320 | A320 | SP 2723 | SP 2723 | SP 2723* | EW-500 |
|---|---|---|---|---|---|---|---|---|
| Cross-link C200-y | CX-47 | CX-47 | CX-47 | CX-47 | C200-y | C200-y | C200-y | |
| % CX-47 or C200-y | 15% | 15% | 15% | 15% | 5% | 5% | 5% | |
| Pressure | 35 bar | 35 bar | 15 bar | 15 bar | 32 bar | 32 bar | 31 bar | 35 bar |
| Treat/Dry | + | | + | | | + | + | + |
| Treat/Wet | | | | | + | | | |
| Post-Cure | | | | | + | + | | |
| Ambient | + | + | + | + | | | + | + |
| Load (PSI) | 827 | 1007 | 913 | 1010 | 690 | 880 | 997 | 1407 |
| Load (kg/cm$^2$) | 58.1 | 70.8 | 64.2 | 71.0 | 48.5 | 61.9 | 70.1 | 98.9 |
| % WF | 81 | 72 | 82 | 77 | 41 | 48 | 96 | 98 |

It was found that the hybrid glue performed well under all conditions tested. Thus, the percentage wood failure (% WF) was consistently above 85% for the hybrid glue of the present invention (Table 1A). There did not appear to be an improvement with the 20% hybrid mix over the 15% hybrid mix. Additionally, there was no apparent benefit to post-curing the hybrid (Table 1; post-cure vs. ambient). Thus, it was found, as measured by the in-house flexure method, that the hybrid adhesive works well under normal operating parameters used for chemically treating wood prior to, or after, fingerjointing.

After initial screening using the in-house flexure test, the various adhesives were tested using the ASTM D 5572 tension test procedure (ASTM D 5572: Standard Specification for Adhesives Used for Finger Joints in Nonstructural Lumber Products, Reapproved 1999). In the ASTM D 5572 tension test procedure, two pieces of wood that are fingerjointed in a central portion are pulled apart from each end. For these tests boards having a size as prescribed by the ASTM test protocol were used (i.e., ¼ inches by ¾ inches by 10 inches; 6.35 mm by 19.1 mm by 254 mm).

Table 2 shows results for testing of various glues by the ASTM D 5572 tension test. Shown in Table 2A are results for hybrid glues (i.e., Isoset® CX-47 mixed with PVA SP 2723) of the present invention, as well as other glue types. Hybrid glues tested included a 15% hybrid (i.e., 15 wt. % Isoset® CX-47/85% wt. PVA SP 2723) or a 20% hybrid (i.e., 20 wt. % ISOSET® CX-47/80 wt. % PVA SP 2723) (Table 2A). Also tested were a polyurethane (PUR) adhesive (Ashland EW-500; Ashland Specialty Chemicals, Ashland, Ohio), and a PVA adhesive without the CX-47 cross-linker, but including 5% aluminum chloride (AlCl$_3$) as a catalyst (PVA). Additional adhesives tested included an ethylene vinyl acetate (EVA) resin (Ashland Specialty Chemicals) mixed with ISOSET® CX-47 (ISO, Table 2B).

Thus, for each of the glue types shown in Table 2, the glued samples were either pressure-treated (Treated) with the treatment formulation (as described above), or not pressure-treated (Control), prior to being exposed to the four ASTM exposure conditions described below (i.e., Dry; Vacuum-Pressure; Elevated Temperature; and Boil Exposure). In addition, some of the samples were subjected to a heat-cure step of heating at 120° F. (49° C.) for 16 hours after gluing (Post-Cure) prior to high temperature/high pressure treatment with the treatment formulation and testing. Table 2B also shows an experiment where samples were glued using a polyurethane-base (PUR) glue, and the fingerjoints were compressed together for varying times (i.e., 8 seconds or 10 seconds) during the gluing step (Table 2B). Finally, the PVA-Pretreat sample (Table 2A) was pressure-treated with treatment formulation prior to gluing, rather than after gluing.

After gluing (with or without a cure step), and optionally, pressure-treating with the treatment formulation, the wood was then exposed to one of four treatment conditions according to ASTM D 5572 specifications. A portion of the wood (ASTM—Dry Condition) was dried within the allowable range of ±1% moisture content (MC) prior to testing. Another portion of the wood (ASTM—Vacuum-Pressure Exposure) was glued and then placed in the treatment vessel filled with 70° F. water and exposed to a vacuum of −25 inches for 30 minutes, and then an elevated pressure of 75 psi for 30 minutes prior to testing. Another portion of the wood (ASTM—Elevated Temperature) was exposed to an elevated temperature of 220° F. for 6 hours. A fourth portion of the wood (ASTM—Boil Exposure) was boiled for 4 hours, dried for 20 hours at 145° F., boiled again for 4 hours, rinsed with 70° F. water for 1 hour, and then tested. For all of the test conditions, failure of the seal was measured by determining amount of force in pounds per square inch (psi) (or kg/cm$^2$) required to shear a measured percentage of the wood pieces (Load—psi) where a higher percentage of wood failure correlates with a lower adhesive failure.

It was found (Table 2) that the ISOSET/PVA hybrid glue of the present invention worked better than the other adhesives tested. There was no apparent improvement with the 20% hybrid mix over the 15% hybrid mix. Additional testing has shown that hybrid adhesive having less than 10% of the isocyanate cross-linker may result in reduced performance. Additionally, there was no apparent benefit to post-curing the hybrid adhesive (Table 2; post-cure vs. ambient). The high performance of the hybrid adhesive without a post-cure step may reduce the time between fingerjointing and treating by 12 hours or more. Thus, it was found that the hybrid adhesive works well under normal operating parameters used for chemically treating wood prior to, or after, fingerjointing.

Also, the increased water resistance of the hybrid glue of the present invention is exemplified by the results of the ASTM D 5572 tension tests under the Vacuum-Pressure and/or Boil conditions where the glue is exposed conditions of high moisture and either high temperature or changes in pressure. Thus, it can be seen that the hybrid glue of the present invention exhibits a higher percentage Wood Failure (i.e., a lower adhesive failure) in the Vacuum-Pressure and Boil tests than the other glues tested (e.g., EVA/CX-47; PUR; or PVA).

TABLE 2

2A

| Sample | Dry Condition Load (PSI) (kg/cm$^2$) | Dry Condition Wood Failure (%) | Vacuum-Pressure Load (PSI) (kg/cm$^2$) | Vacuum-Pressure Wood Failure (%) | Elevated Temperature Load (PSI) (kg/cm$^2$) | Elevated Temperature Wood Failure (%) | Boil Exposure Load (PSI) kg/cm$^2$ | Boil Exposure Wood Failure (%) |
|---|---|---|---|---|---|---|---|---|
| 15% Hybrid Post-cure (Treat) | 5365 377.3 | 96 | 2447 172.1 | 89 | 3485 245.1 | 91 | 2590 182.1 | 83 |
| 20% Hybrid Post-cure (Treat) | 5052 355.3 | 97 | 3389 238.3 | 94 | 3133 220.3 | 89 | 3002 211.1 | 85 |
| 15% Hybrid Ambient (Treat) | 5498 386.6 | 95 | 2772 194.9 | 84 | 4004 281.6 | 91 | 2802 197.1 | 81 |
| 20% Hybrid Ambient (Treat) | 4500 316.5 | 95 | 2467 173.5 | 90 | 2796 196.6 | 88 | 2111 148.5 | 89 |
| PUR (Treat) | 4784 336.4 | 94 | 3039 213.7 | 72 | 4086 287.3 | 84 | 2690 189.2 | 79 |
| PVA Pretreat | 3599 253.1 | 59 | 1707 120.0 | 22 | 1399 98.3 | 9 | 1691 118.9 | 35 |

2B

| Sample | Dry Condition Load (PSI) (kg/cm$^2$) | Dry Condition Wood Failure (%) | Vacuum-Pressure Load (PSI) (kg/cm$^2$) | Vacuum-Pressure Wood Failure (%) | Elevated Temperature Load (PSI) (kg/cm$^2$) | Elevated Temperature Wood Failure (%) | Boil Exposure Load (PSI) (kg/cm$^2$) | Boil Exposure Wood Failure (%) |
|---|---|---|---|---|---|---|---|---|
| PUR-8 sec (Treat) | 4754 334.2 | 97 | 2565 180.4 | 55 | 3806 267.7 | 86 | 2519 177.1 | 52 |
| PUR-10 sec (Treat) | 4671 328.5 | 95 | 2918 205.2 | 72 | 4272 300.4 | 87 | 2307 162.2 | 50 |
| ISO Post-Cure (Control) | 4375 307.7 | 83 | 1845 129.8 | 64 | 3399 239.0 | 87 | 1769 124.4 | 44 |
| ISO Ambient (Control) | 4221 296.8 | 82 | 1592 112.0 | 32 | 3556 250.1 | 74 | 1737 122.2 | 27 |
| ISO Post-Cure (Treat) | 3471 244.1 | 81 | 1635 115.0 | 40 | N/d* | N/d | N/d | N/d |

TABLE 2-continued

| | | | | | | | | |
|---|---|---|---|---|---|---|---|---|
| ISO Ambient (Treat) | 3279 230.6 | 72 | 1781 125.2 | 35 | N/d | N/d | N/d | N/d |
| PVA-Control | 4311 303.2 | 89 | 1939 136.4 | 54 | N/d | N/d | N/d | N/d |
| PVA-Treat | 2519 177.1 | 59 | 1354 95.2 | 45 | N/d | N/d | N/d | N/d |

*N/d = Not determined

Table 3 provides additional results using the ASTM D 5572 tension test that compare a hybrid glue of the present invention to a PVA-aluminum chloride glue and a PUR glue typically used to glue wood that has been treated. As described in the experiments above, samples that were subjected to a heat-cure step (heating at 120° F. (49° C.) for 16 hours) after gluing and prior to high temperature/high pressure treatment with the treatment formulation and testing are denoted "post-cure." Samples treated with glue, but that were not post-cured are denoted as "ambient." Samples denoted "pretreat" were pressure-treated with treatment formulation prior to gluing, rather than after gluing.

TABLE 3

Testing of Treated Wood

| | Dry Condition | | Vacuum-Pressure | | Elevated Temperature | | Boil Exposure | |
|---|---|---|---|---|---|---|---|---|
| Sample | Load (PSI) (kg/cm$^2$) | Wood Failure (%) | Load (PSI) (kg/cm$^2$) | Wood Failure (%) | Load (PSI) (kg/cm$^2$) | Wood Failure (%) | Load (PSI) (kg/cm$^2$) | Wood Failure (%) |
| Hybrid 15% Post-cure | 5365 377.3 | 96 | 2447 172.1 | 89 | 3485 245.1 | 91 | 2590 182.1 | 83 |
| Hybrid 20% Post-cure | 5052 358.1 | 97 | 3389 238.3 | 94 | 3133 220.3 | 89 | 3002 211.1 | 85 |
| Hybrid 15% Ambient | 5498 386.6 | 95 | 2772 194.9 | 84 | 4004 281.6 | 91 | 2802 197.1 | 81 |
| Hybrid 20% Ambient | 4500 316.5 | 95 | 2467 173.5 | 90 | 2796 196.6 | 88 | 2111 148.5 | 89 |
| PVA-AlCl$_3$ pre-treat | 3599 253.1 | 59 | 1707 120.0 | 22 | 1399 98.4 | 9 | 1691 118.9 | 35 |
| PVA-AlCl$_3$ post-treat | 4421 310.9 | 90 | 2515 176.9 | 83 | 2134 150.1 | 50 | 2246 158.0 | 87 |
| EW-500 (PUR) Ambient | 4784 336.4 | 94 | 3039 213.7 | 72 | 4086 287.3 | 84 | 2690 189.2 | 79 |
| 16.7% Hybrid Ambient | 4689 329.8 | 99 | 2027 142.6 | 82 | 3752 263.9 | 97 | 2283 160.6 | 94 |

The hybrid glue of the present invention was also applied to wood that was not treated using a treatment formulation. The results are presented in Table 4. In these experiments, 36% less hybrid adhesive was used than the PVA control. It can be seen that for untreated wood, the hybrid glue consistently resulted in wood failure of 88% or better. The results shown in Table 4 are the mean of 20 tests; for the hybrid glue, every sample showed a wood failure percent of 85% or higher.

TABLE 4

Testing of Untreated Wood

| | Dry Condition | | Vacuum-Pressure | | Elevated Temperature | | Boil Exposure | |
|---|---|---|---|---|---|---|---|---|
| Sample | Load (PSI) (kg/cm$^2$) | Wood Failure (%) | Load (PSI) (kg/cm$^2$) | Wood Failure (%) | Load (PSI) (kg/cm$^2$) | Wood Failure (%) | Load (PSI) (kg/cm$^2$) | Wood Failure (%) |
| PVA | 8027 564.5 | 91 | 2164 152.2 | 35 | 3716 261.3 | 21 | 2686 183.9 | 45 |
| Hybrid | 7920 557.0 | 98 | 2639 185.6 | 88 | 7480 520.4 | 92 | 3313 233.0 | 88 |

* Values are the mean of 20 determinations; for the hybrid glue.

It will be understood that the present invention also comprises wood products that may be produced using the hybrid adhesive formulation of the present invention. Also, the present invention comprises wood products produced using the methods and systems of the present invention. It should be understood that various changes and modifications to the embodiments described herein will be apparent to those skilled in the art. Such changes and modifications can be made without departing from the spirit and scope of the present invention and without diminishing its attendant scope and/or advantages.

That which is claimed is:

1. A wood product comprising:
a plurality of wood pieces having been treated with a treatment formulation comprising:
water;
at least one of a pesticide, a fungicide, or an insecticide;
a preservative comprising tebuconazole;
and a water repellant;
wherein the wood pieces are bonded together by an adhesive to form a window or door structure, wherein the adhesive comprises:
80% to 84% by weight of polymer resin, wherein the polymer resin comprises polyvinyl acetate polymer and polyvinyl alcohol; and
16% to 20% by weight of isocyanate cross-linking agent, wherein the isocyanate cross-linking agent comprises a diphenylmethane diisocyanate (MDI).

2. The wood product of claim 1, wherein the wood pieces comprise fingerjoint cutstock, and wherein at least two of the wood pieces are bonded together by the adhesive between the fingers of the fingerjoint cutstock.

3. The wood product of claim 1, wherein the treatment formulation further comprises an emulsifier.

4. The wood product of claim 1, wherein the treatment formulation comprises a surfactant selected from at least one of the following: a nonionic surfactant, an anionic surfactant and an amphoteric surfactant.

5. The wood product of claim 1, wherein the water repellant of the treatment formulation is selected from a wax or an oil.

6. The wood product of claim 1, wherein the adhesive provides a bond strength of greater than 80% wood failure as measured by ASTM D 5572.

7. The wood product of claim 1, wherein the adhesive comprises about 83% to about 84% by weight of the polymer resin, and about 16% to about 17% by weight of the isocyanate cross-linking agent.

8. The wood product of claim 1, wherein the isocyanate cross-linking agent of the adhesive comprises at least one of the following: a pure MDI, a polymeric MDI, or a mixture of a pure MDI and a polymeric MDI.

9. The wood product of claim 8, wherein the isocyanate cross-linking agent comprises:
about 45 to about 55% by weight poly(methylene phenylene isocyanate), about 40 to about 50% by weight methylene diphenyldiisocyanate, and about 1% to about 10% by weight methylene diphenylisocyanate.

10. The wood product of claim 1, wherein the adhesive comprises about 83% to about 84% by weight of the polymer resin, and about 16% to about 17% by weight of the isocyanate cross-linking agent, the isocyanate cross-linking agent comprising:
about 45 to about 55% by weight poly(methylene phenylene isocyanate), about 40 to about 50% by weight methylene diphenyldiisocyanate, and about 1% to about 10% by weight methylene diphenylisocyanate.

11. The wood product of claim 1, wherein the polymer resin comprises about 10% to about 79% by weight polyvinyl acetate polymer, and about 5% to about 15% by weight polyvinyl alcohol.

12. A wood product comprising:
a plurality of wood pieces having been treated with a treatment formulation comprising:
water;
at least one of a pesticide, a fungicide, or an insecticide;
a preservative comprising tebuconazole;
and a water repellant;
wherein the treated wood pieces have a moisture content of about 5% to about 20%, and
wherein the treated wood pieces having a moisture content of about 5% to about 20% are bonded together by an adhesive to form a window or door structure, wherein the adhesive comprises:
80% to 84% by weight of polymer resin, wherein the polymer resin comprises polyvinyl acetate polymer and polyvinyl alcohol; and
16% to 20% by weight of isocyanate cross-linking agent, wherein the isocyanate cross-linking agent comprises a diphenylmethane diisocyanate (MDI).

13. The wood product of claim 12, wherein the adhesive comprises about 83% to about 84% by weight of the polymer resin, and about 16% to about 17% by weight of the isocyanate cross-linking agent.

\* \* \* \* \*